US009165433B2

(12) United States Patent
Caputo

(10) Patent No.: US 9,165,433 B2
(45) Date of Patent: Oct. 20, 2015

(54) GAMING SYSTEM, GAMING DEVICE, AND METHOD FOR PROVIDING A CASCADING SYMBOL GAME INCLUDING SHIFTING SYMBOLS ACCORDING TO DIRECTIONAL INDICATORS

(75) Inventor: Scott A. Caputo, Santa Clara, CA (US)

(73) Assignee: IGT, Las Vegas, NV (US)

( * ) Notice: Subject to any disclaimer, the term of this patent is extended or adjusted under 35 U.S.C. 154(b) by 1201 days.

(21) Appl. No.: 12/615,869

(22) Filed: Nov. 10, 2009

(65) Prior Publication Data

US 2011/0111825 A1 May 12, 2011

(51) Int. Cl.
*A63F 13/00* (2014.01)
*G07F 17/32* (2006.01)

(52) U.S. Cl.
CPC ........ *G07F 17/3295* (2013.01); *G07F 17/3265* (2013.01)

(58) Field of Classification Search
CPC ......................... G07F 17/3265; G07F 17/3295
USPC ........................ 463/16–20, 21, 30–33, 40–42
See application file for complete search history.

(56) References Cited

U.S. PATENT DOCUMENTS

| | | | |
|---|---|---|---|
| 1,564,746 | A | 12/1925 | Barnard |
| 1,978,395 | A | 10/1934 | Groetchen |
| 3,420,525 | A | 1/1969 | Waders |
| 3,642,287 | A | 2/1972 | Lally et al. |
| 3,735,987 | A | 5/1973 | Ohki |
| 3,977,681 | A | 8/1976 | Deitrich |
| 4,099,722 | A | 7/1978 | Rodesch et al. |
| 4,114,890 | A | 9/1978 | Yamamoto et al. |
| 4,171,814 | A | 10/1979 | Tamano |

(Continued)

FOREIGN PATENT DOCUMENTS

| | | |
|---|---|---|
| AU | 710015 | 9/1997 |
| AU | 722969 | 6/1998 |

(Continued)

OTHER PUBLICATIONS

50 Lions, written by videoslotmachines.com, published prior to 2007.

(Continued)

*Primary Examiner* — Ronald Laneau
*Assistant Examiner* — Ross Williams
(74) *Attorney, Agent, or Firm* — Neal, Gerber & Eisenberg LLP

(57) ABSTRACT

The disclosed gaming system displays an arrangement of symbols including a plurality of symbol positions. For a play of the game, the gaming system displays a randomly generated symbol in each symbol position. One or more of the symbols are displayed as associated with a directional indicator indicating a shift direction for that symbol. If any winning symbol combination is displayed, the gaming system shifts at least one symbol within the symbol matrix according to the directional indicator associated with that symbol, such as by shifting the symbol as designated distance in the shift direction indicated by the symbol's directional indicator. In one embodiment, the gaming system removes one or more symbols in the shift path of a shifting symbol. In one embodiment, the gaming system generates and displays new symbols in the then-empty symbol positions of the symbol matrix and repeats the determination, shifting, and generation.

35 Claims, 14 Drawing Sheets

(56) References Cited

U.S. PATENT DOCUMENTS

| | | | |
|---|---|---|---|
| 4,198,052 | A | 4/1980 | Gauselmann |
| 4,200,291 | A | 4/1980 | Hooker |
| 4,326,351 | A | 4/1982 | Heywood et al. |
| 4,357,567 | A | 11/1982 | Rock |
| 4,448,419 | A | 5/1984 | Telnaes |
| 4,573,681 | A | 3/1986 | Okada |
| 4,636,951 | A | 1/1987 | Harlick |
| 4,695,053 | A | 9/1987 | Vazquez, Jr. et al. |
| 4,756,532 | A | 7/1988 | Kamille |
| 4,790,537 | A | 12/1988 | Smyth et al. |
| 4,826,169 | A | 5/1989 | Bessho et al. |
| 4,838,552 | A | 6/1989 | Hagiwara |
| 4,874,173 | A | 10/1989 | Kishishita |
| 5,019,973 | A | 5/1991 | Wilcox et al. |
| 5,092,598 | A | 3/1992 | Kamille |
| 5,152,529 | A | 10/1992 | Okada |
| 5,205,555 | A | 4/1993 | Hamano |
| RE34,244 | E | 5/1993 | Hagiwara |
| 5,308,065 | A | 5/1994 | Bridgeman et al. |
| 5,332,228 | A | 7/1994 | Schultz |
| 5,364,100 | A | 11/1994 | Ludlow et al. |
| 5,393,061 | A | 2/1995 | Manship et al. |
| 5,395,111 | A | 3/1995 | Inoue |
| 5,423,539 | A | 6/1995 | Nagao |
| 5,431,408 | A | 7/1995 | Adams |
| 5,449,173 | A | 9/1995 | Thomas et al. |
| 5,564,700 | A | 10/1996 | Celona |
| 5,580,053 | A | 12/1996 | Crouch |
| 5,584,764 | A | 12/1996 | Inoue |
| 5,609,524 | A | 3/1997 | Inoue |
| 5,611,535 | A | 3/1997 | Tiberio |
| 5,624,119 | A | 4/1997 | Leake |
| 5,664,998 | A | 9/1997 | Seelig et al. |
| 5,704,835 | A | 1/1998 | Dietz, II |
| 5,720,662 | A | 2/1998 | Holmes et al. |
| 5,722,891 | A | 3/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,772,506 | A | 6/1998 | Marks et al. |
| 5,807,172 | A | 9/1998 | Piechowiak |
| 5,813,911 | A | 9/1998 | Margolin |
| 5,823,873 | A | 10/1998 | Moody |
| 5,833,238 | A | 11/1998 | Watanabe |
| 5,833,536 | A | 11/1998 | Davids et al. |
| 5,833,537 | A | 11/1998 | Barrie |
| 5,855,514 | A | 1/1999 | Kamille |
| 5,863,249 | A | 1/1999 | Inoue |
| 5,882,260 | A | 3/1999 | Marks et al. |
| 5,927,714 | A | 7/1999 | Kaplan |
| 5,935,002 | A | 8/1999 | Falciglia |
| 5,951,397 | A | 9/1999 | Dickinson |
| 5,980,384 | A | 11/1999 | Barrie |
| 5,984,782 | A | 11/1999 | Inoue |
| 5,997,400 | A | 12/1999 | Seelig et al. |
| 5,997,401 | A | 12/1999 | Crawford |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,086,066 | A | 7/2000 | Takeuchi et al. |
| 6,089,976 | A | 7/2000 | Schneider et al. |
| 6,089,977 | A | 7/2000 | Bennett |
| 6,093,102 | A | 7/2000 | Bennett |
| 6,095,921 | A | 8/2000 | Walker et al. |
| 6,117,013 | A | 9/2000 | Eiba |
| 6,120,031 | A | 9/2000 | Adams |
| 6,120,376 | A | 9/2000 | Cherry |
| 6,120,377 | A | 9/2000 | McGinnis et al. |
| 6,142,875 | A | 11/2000 | Kadachi et al. |
| 6,149,521 | A | 11/2000 | Sanduski |
| 6,159,095 | A | 12/2000 | Frohm et al. |
| 6,159,096 | A | 12/2000 | Yoseloff |
| 6,174,235 | B1 | 1/2001 | Walker et al. |
| 6,190,254 | B1 | 2/2001 | Bennett |
| 6,203,009 | B1 | 3/2001 | Sines et al. |
| 6,220,959 | B1 | 4/2001 | Holmes, Jr. et al. |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,254,481 | B1 | 7/2001 | Jaffe |
| 6,261,178 | B1 | 7/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,302,429 | B1 | 10/2001 | Friedrich |
| 6,305,686 | B1 | 10/2001 | Perrie et al. |
| 6,311,976 | B1 | 11/2001 | Yoseloff et al. |
| 6,315,660 | B1 | 11/2001 | DeMar et al. |
| 6,315,663 | B1 | 11/2001 | Sakamoto |
| 6,318,721 | B1 | 11/2001 | Randall et al. |
| 6,319,124 | B1 | 11/2001 | Baerlocher et al. |
| 6,322,078 | B1 | 11/2001 | Adams |
| 6,347,996 | B1 | 2/2002 | Gilmore et al. |
| 6,358,144 | B1 | 3/2002 | Kadlic et al. |
| 6,364,766 | B1 | 4/2002 | Anderson et al. |
| 6,375,570 | B1 | 4/2002 | Poole |
| 6,394,902 | B1 | 5/2002 | Glavich et al. |
| 6,398,644 | B1 | 6/2002 | Perrie et al. |
| 6,409,602 | B1 | 6/2002 | Wiltshire et al. |
| 6,413,161 | B1 | 7/2002 | Baerlocher et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,439,995 | B1 | 8/2002 | Hughs-Baird et al. |
| 6,454,266 | B1 | 9/2002 | Breeding et al. |
| 6,464,581 | B1 | 10/2002 | Yoseloff et al. |
| 6,481,713 | B2 | 11/2002 | Perrie et al. |
| 6,494,454 | B2 | 12/2002 | Adams |
| 6,494,785 | B1 | 12/2002 | Gerrard et al. |
| 6,506,114 | B1 | 1/2003 | Estes et al. |
| 6,514,141 | B1 | 2/2003 | Kaminkow et al. |
| 6,517,432 | B1 | 2/2003 | Jaffe |
| 6,517,433 | B2 | 2/2003 | Loose et al. |
| 6,551,187 | B1 | 4/2003 | Jaffe |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,433 | B1 | 5/2003 | Baerlocher et al. |
| 6,575,830 | B2 | 6/2003 | Baerlocher et al. |
| 6,585,591 | B1 | 7/2003 | Baerlocher et al. |
| 6,589,114 | B2 | 7/2003 | Rose |
| 6,602,136 | B1 | 8/2003 | Baerlocher et al. |
| 6,602,137 | B2 | 8/2003 | Kaminkow et al. |
| 6,604,740 | B1 | 8/2003 | Singer et al. |
| 6,616,142 | B2 | 9/2003 | Adams |
| 6,632,139 | B1 | 10/2003 | Baerlocher |
| 6,632,140 | B2 | 10/2003 | Berman et al. |
| 6,634,945 | B2 | 10/2003 | Glavich et al. |
| 6,641,137 | B2 | 11/2003 | Sines et al. |
| 6,641,477 | B1 | 11/2003 | Dietz |
| 6,643,943 | B2 | 11/2003 | Dall'Aglio et al. |
| 6,644,663 | B2 | 11/2003 | Seelig et al. |
| 6,659,864 | B2 | 12/2003 | McGahn et al. |
| 6,666,767 | B1 | 12/2003 | Dayan |
| 6,672,960 | B1 | 1/2004 | B-Jensen |
| 6,676,511 | B2 | 1/2004 | Payne et al. |
| 6,676,512 | B2 | 1/2004 | Fong et al. |
| 6,695,696 | B1 | 2/2004 | Kaminkow |
| 6,702,671 | B2 | 3/2004 | Tarantino |
| 6,702,675 | B2 | 3/2004 | Poole et al. |
| 6,712,693 | B1 | 3/2004 | Hettinger |
| 6,719,630 | B1 | 4/2004 | Seelig et al. |
| 6,726,204 | B2 | 4/2004 | Inoue |
| 6,731,313 | B1 | 5/2004 | Kaminkow |
| 6,733,386 | B2 | 5/2004 | Cuddy et al. |
| 6,758,747 | B2 | 7/2004 | Baerlocher |

(56) References Cited

U.S. PATENT DOCUMENTS 6,780,109 B2 8/2004 Kaminkow
6,783,455 B2 8/2004 Glavich
6,786,820 B2 9/2004 Gerrard et al.
6,802,775 B2 10/2004 Baerlocher et al.
6,805,349 B2 10/2004 Baerlocher et al.
6,808,454 B2 10/2004 Gerrard et al.
6,817,944 B2 11/2004 Kaminkow et al.
6,832,957 B2 12/2004 Falconer
6,835,133 B2 12/2004 Baerlocher et al.
6,837,788 B2 1/2005 Cannon
6,855,054 B2 2/2005 White et al.
6,863,607 B2 3/2005 Gerrard
6,866,583 B2 3/2005 Glavich et al.
6,875,106 B2 4/2005 Weiss et al.
6,880,826 B2 4/2005 Inoue
6,896,615 B2 5/2005 Berman
6,896,617 B2 5/2005 Daly
6,905,405 B2 6/2005 McClintic
6,905,406 B2 6/2005 Kaminkow et al.
6,908,084 B2 6/2005 Jackson
6,908,383 B2 6/2005 Baerlocher et al.
6,910,962 B2 6/2005 Marks et al.
6,913,533 B2 7/2005 Cuddy et al.
6,918,832 B2 7/2005 Baerlocher et al.
6,921,335 B2 7/2005 Rodgers et al.
6,923,441 B2 8/2005 Inoue
6,929,952 B2 8/2005 Baerlocher
6,932,700 B2 8/2005 Bennett et al.
6,939,223 B1 9/2005 Jones
6,942,571 B1 9/2005 McAllister et al.
6,942,572 B2 9/2005 Inoue
6,958,013 B2 10/2005 Miereau et al.
6,960,133 B1 11/2005 Marks et al.
6,971,953 B2 12/2005 Gerrard et al.
6,971,955 B2 12/2005 Baerlocher et al.
6,976,915 B2 12/2005 Baker et al.
6,979,263 B2 12/2005 Baerlocher et al.
6,981,635 B1 1/2006 Hughs-Baird et al.
6,986,710 B2 1/2006 Baerlocher et al.
6,988,694 B2 1/2006 Barrs et al.
6,988,947 B2 1/2006 Baerlocher et al.
6,991,538 B2 1/2006 Cannon
6,997,804 B2 2/2006 Berman
6,997,806 B2 2/2006 Falciglia, Sr.
6,997,808 B2 2/2006 Rodgers et al.
7,001,274 B2 2/2006 Baerlocher et al.
7,014,559 B1 3/2006 Fong
7,014,560 B2 3/2006 Glavich et al.
7,018,293 B2 3/2006 Brown et al.
7,040,985 B2 5/2006 Vancura
7,048,275 B2 5/2006 Adams
7,052,395 B2 5/2006 Glavich et al.
7,056,213 B2 6/2006 Ching et al.
7,056,214 B2 6/2006 Miereau et al.
7,070,502 B1 7/2006 Bussick et al.
7,074,127 B2 7/2006 Cuddy et al.
7,077,744 B2 7/2006 Cannon
7,077,745 B2 7/2006 Gomez et al.
7,090,580 B2 8/2006 Rodgers et al.
7,094,148 B2 8/2006 Baerlocher et al.
7,104,886 B2 9/2006 Baerlocher et al.
7,104,888 B2 9/2006 Miereau et al.
7,108,602 B2 9/2006 Daly
7,112,135 B2 9/2006 Anderson et al.
7,137,888 B2 11/2006 Glavich et al.
7,144,322 B2 12/2006 Gomez et al.
7,153,205 B2 12/2006 Baerlocher
7,160,186 B2 1/2007 Cuddy et al.
7,160,187 B2 1/2007 Loose et al.
7,168,704 B1 1/2007 Lawless
7,169,042 B2 1/2007 Muir et al.
7,172,506 B2 2/2007 Baerlocher et al.
7,192,345 B2 3/2007 Muir et al.
7,192,347 B1 3/2007 Marks et al.
7,195,559 B2 3/2007 Gilmore et al.
7,204,753 B2 4/2007 Ozaki et al.
7,226,359 B2 6/2007 Bussick et al.
7,236,113 B1 6/2007 Wang
7,252,591 B2 8/2007 Van Asdale
7,252,592 B2 8/2007 Rodgers et al.
7,275,988 B2 10/2007 Aida et al.
7,294,058 B1 11/2007 Slomiany et al.
7,309,281 B2 12/2007 Baerlocher et al.
7,309,282 B2 12/2007 Baerlocher et al.
7,314,409 B2 1/2008 Maya et al.
7,318,773 B2 1/2008 Baerlocher
7,331,862 B2 2/2008 Rodgers et al.
7,331,866 B2 2/2008 Rodgers et al.
7,335,102 B2 2/2008 Baerlocher et al.
7,338,367 B2 3/2008 Kaminkow et al.
7,338,369 B2 3/2008 Mierau et al.
7,351,141 B2 4/2008 Rodgers et al.
7,354,344 B2 4/2008 Paulsen et al.
7,357,713 B2 4/2008 Marks et al.
7,371,168 B2 5/2008 Bilyeu et al.
7,371,169 B2 5/2008 Baerlocher
7,371,170 B2 5/2008 Cregan et al.
7,371,173 B2 5/2008 Gatto et al.
7,377,849 B2 5/2008 Baerlocher et al.
7,396,279 B2 7/2008 Berman et al.
7,399,225 B2 7/2008 Kaminkow
7,402,102 B2 7/2008 Marks et al.
7,419,431 B2 9/2008 Gauselmann et al.
7,442,123 B2 10/2008 Brill et al.
7,448,948 B2 11/2008 Hughs-Baird et al.
7,488,250 B2 2/2009 Baerlocher et al.
7,578,735 B2 8/2009 Frizzell et al.
7,611,406 B2 11/2009 Fuller
7,618,315 B2 11/2009 Thomas et al.
7,674,176 B2 3/2010 Berman et al.
2002/0010017 A1 1/2002 Bennett
2002/0052233 A1 5/2002 Gauselmann
2002/0068623 A1 6/2002 Gauselmann
2002/0077165 A1 6/2002 Bansemer et al.
2002/0160836 A1 10/2002 Watanabe et al.
2003/0013518 A1 1/2003 Graham
2003/0045345 A1 3/2003 Bermin
2003/0054874 A1 3/2003 Kaminkow
2003/0057645 A1 3/2003 Baerlocher et al.
2003/0060267 A1 3/2003 Glavich et al.
2003/0092480 A1 5/2003 White et al.
2003/0100356 A1 5/2003 Brown et al.
2003/0125100 A1 7/2003 Cannon
2003/0153382 A1 8/2003 Vancura
2003/0157981 A1 8/2003 Marks et al.
2003/0203752 A1 10/2003 Kaminkow et al.
2003/0203753 A1 10/2003 Muir et al.
2003/0207710 A1 11/2003 Rodgers et al.
2004/0012145 A1 1/2004 Inoue
2004/0014516 A1 1/2004 Inoue
2004/0014517 A1 1/2004 Inoue
2004/0018866 A1 1/2004 Inoue
2004/0026854 A1 2/2004 Inoue
2004/0033827 A1 2/2004 Gilmore et al.
2004/0033829 A1 2/2004 Pacey et al.
2004/0036218 A1 2/2004 Inoue
2004/0038726 A1 2/2004 Inoue
2004/0043809 A1 3/2004 Gomez et al.
2004/0048650 A1 3/2004 Mierau et al.
2004/0048651 A1 3/2004 Vorias et al.
2004/0053669 A1 3/2004 Gerrard et al.
2004/0053672 A1 3/2004 Baerlocher
2004/0053676 A1 3/2004 Rodgers
2004/0053677 A1 3/2004 Hughs-Baird
2004/0067790 A1 4/2004 Petersoon et al.
2004/0072612 A1 4/2004 Rodgers et al.
2004/0092302 A1 5/2004 Gauselmann
2004/0097280 A1 5/2004 Gauselmann
2004/0102236 A1 5/2004 Suda et al.
2004/0106444 A1 6/2004 Cuddy et al.
2004/0137981 A1 7/2004 Gauselmann et al.
2004/0137982 A1 7/2004 Cuddy et al.
2004/0147306 A1 7/2004 Randall et al.
2004/0235556 A1 11/2004 Flemming et al.

(56) References Cited

U.S. PATENT DOCUMENTS

2004/0242313 A1 12/2004 Munoz
2005/0020344 A1 1/2005 Kaminkow
2005/0049035 A1 3/2005 Baerlocher et al.
2005/0054405 A1 3/2005 Baerlocher et al.
2005/0054418 A1 3/2005 Baerlocher
2005/0054429 A1 3/2005 Baerlocher et al.
2005/0059446 A1 3/2005 Kaminkow
2005/0059474 A1 3/2005 O'Halloran
2005/0059477 A1 3/2005 Baerlocher
2005/0059478 A1 3/2005 Peterson et al.
2005/0064924 A1 3/2005 Glavich et al.
2005/0070354 A1 3/2005 Baerlocher et al.
2005/0071023 A1 3/2005 Gilliland et al.
2005/0096121 A1 5/2005 Gilliland et al.
2005/0101372 A1 5/2005 Mierau et al.
2005/0101380 A1 5/2005 Glavich et al.
2005/0119403 A1 6/2005 St. Clair
2005/0148381 A1 7/2005 Marks et al.
2005/0148384 A1 7/2005 Marks et al.
2005/0164774 A1 7/2005 Gauselmann
2005/0187004 A1 8/2005 Vancura
2005/0192081 A1 9/2005 Marks et al.
2005/0208994 A1 9/2005 Berman
2005/0227754 A1 10/2005 Kaminkow et al.
2005/0255903 A1 11/2005 Jackson
2005/0282620 A1 12/2005 Marks et al.
2005/0288094 A1 12/2005 Marks et al.
2006/0019738 A1 1/2006 Baerlocher et al.
2006/0025196 A1 2/2006 Webb et al.
2006/0030387 A1 2/2006 Jackson
2006/0030392 A1 2/2006 Rodgers et al.
2006/0040728 A1 2/2006 Fuller
2006/0046830 A1 3/2006 Webb
2006/0058095 A1 3/2006 Berman et al.
2006/0058097 A1 3/2006 Berman et al.
2006/0063584 A1 3/2006 Brill et al.
2006/0068875 A1 3/2006 Cregan et al.
2006/0068882 A1 3/2006 Baerlocher et al.
2006/0068883 A1 3/2006 Randall et al.
2006/0068884 A1 3/2006 Baerlocher et al.
2006/0068885 A1 3/2006 Cregan et al.
2006/0073872 A1 4/2006 B-jensen et al.
2006/0073876 A1 4/2006 Cuddy
2006/0073879 A1 4/2006 Baerlocher
2006/0084492 A1 4/2006 Baerlocher et al.
2006/0084493 A1 4/2006 Pederson et al.
2006/0084494 A1 4/2006 Belger et al.
2006/0084498 A1 4/2006 Baerlocher et al.
2006/0089191 A1 4/2006 Singer et al.
2006/0111174 A1 5/2006 Baerlocher et al.
2006/0116195 A1 6/2006 Baerlocher et al.
2006/0135247 A1 6/2006 Baerlocher et al.
2006/0154714 A1 7/2006 Montross et al.
2006/0172795 A1 8/2006 Bussick et al.
2006/0172796 A1 8/2006 Vancura
2006/0199636 A1 9/2006 Ching et al.
2006/0199637 A1 9/2006 Ching et al.
2006/0217189 A1 9/2006 Walker et al.
2006/0264254 A1 11/2006 Aoki
2007/0004489 A1 1/2007 Rodgers et al.
2007/0010316 A1 1/2007 Baerlocher et al.
2007/0021175 A1 1/2007 Rodgers et al.
2007/0021187 A1 1/2007 Gauselmann
2007/0021188 A1 1/2007 Rodgers et al.
2007/0026923 A1 2/2007 Muir
2007/0060246 A1 3/2007 Baerlocher et al.
2007/0060248 A1 3/2007 Rodgers et al.
2007/0060255 A1 3/2007 Rodgers et al.
2007/0060294 A1 3/2007 Cuddy et al.
2007/0077976 A1 4/2007 Jackson
2007/0087812 A1 4/2007 Glavich et al.
2007/0191087 A1 8/2007 Thomas et al.
2007/0232382 A1 10/2007 Berman
2007/0232383 A1 10/2007 Berman
2007/0287523 A1 12/2007 Esses et al.
2008/0045322 A1 2/2008 Berman
2008/0045323 A1 2/2008 Berman
2008/0051174 A1 2/2008 Fiden
2008/0064485 A1 3/2008 Tedsen et al.
2008/0090655 A1 4/2008 Marks et al.
2008/0102931 A1 5/2008 Marks
2008/0108411 A1 5/2008 Jensen et al.
2008/0113735 A1 5/2008 Maya
2008/0113765 A1 5/2008 DeWaal
2008/0132320 A1 6/2008 Rodgers
2008/0139298 A1 6/2008 Rodgers et al.
2008/0161097 A1 7/2008 Rodgers et al.
2008/0176620 A1 7/2008 Berman et al.
2008/0176634 A1 7/2008 Berman et al.
2008/0188278 A1 8/2008 Paulsen et al.
2008/0200232 A1 8/2008 Baerlocher et al.
2008/0207305 A1 8/2008 Cregan et al.
2008/0214283 A1 9/2008 Cregan et al.
2008/0227541 A1 9/2008 Berman et al.
2008/0248857 A1 10/2008 Kido
2008/0287178 A1 11/2008 Berman et al.
2008/0287179 A1 11/2008 Berman et al.
2009/0054129 A1 2/2009 Yoshimura et al.
2009/0069071 A1 3/2009 Aoki et al.
2009/0075718 A1 3/2009 Yoshizawa
2009/0118004 A1 5/2009 Hoffman
2009/0170590 A1 7/2009 Thomas et al.
2009/0239631 A1 9/2009 Aoki et al.
2010/0016054 A1 1/2010 Berman et al.

FOREIGN PATENT DOCUMENTS

AU 199917318 9/1999
AU 755879 2/2001
EP 1 184 822 7/1982
EP 058488 8/1982
EP 0 060 019 9/1982
EP 0 874 337 10/1998
EP 0 981 119 2/2000
EP 0 984 408 3/2000
EP 1 063 622 12/2000
EP 1 205 894 10/2001
EP 1 422 673 5/2004
EP 1 513 117 3/2005
GB 1 454 046 10/1976
GB 2 062 922 5/1981
GB 2 062 923 5/1981
GB 2 106 293 9/1981
GB 2 081 952 2/1982
GB 2 090 690 7/1982
GB 2 096 376 10/1982
GB 2 097 160 10/1982
GB 2 100 905 1/1983
GB 2 105 891 3/1983
GB 2 106 295 4/1983
GB 2 113 881 8/1983
GB 2 117 155 10/1983
GB 2 137 392 10/1984
GB 2 161 008 1/1986
GB 2 165 385 4/1986
GB 2 170 636 8/1986
GB 2 181 589 4/1987
GB 2 183 882 6/1987
GB 2 191 030 12/1987
GB 2 180 087 8/1989
GB 2 222 712 3/1990
GB 2 243 236 4/1990
GB 2 225 889 6/1990
GB 2 226 436 6/1990
GB 2 242 300 9/1991
GB 2 262 642 6/1993
GB 2 322 217 8/1998
GB 2 335 524 9/1999
GB 2 372 132 2/2001
GB 2 372 617 8/2002
GB 2 393 555 3/2004
WO WO 97/32285 9/1997
WO WO 98/20949 5/1998
WO WO 00/30727 6/2000

(56) References Cited

FOREIGN PATENT DOCUMENTS

| | | |
|---|---|---|
| WO | WO 00/32286 | 6/2000 |
| WO | WO 00/66235 | 11/2000 |
| WO | WO 00/76606 | 12/2000 |
| WO | WO 01/26019 | 4/2001 |
| WO | WO 03/026756 | 4/2003 |
| WO | WO 03/026759 | 4/2003 |
| WO | WO 2004/025584 | 3/2004 |
| WO | WO 2005/028043 | 3/2005 |
| WO | WO 2006/063290 | 6/2006 |
| WO | WO 2006/076294 | 7/2006 |
| WO | WO 2007/002935 | 1/2007 |
| WO | WO 2007/018680 | 2/2007 |
| WO | WO 2007/053349 | 5/2007 |
| WO | WO 2007/084766 | 7/2007 |
| WO | WO 2007/130443 | 11/2007 |
| WO | WO 2007/130444 | 11/2007 |

OTHER PUBLICATIONS

A Study in Slot Machine Research and Development, written by John Brokopp, published at www.casinocitytimes.com on Nov. 30, 2005.
All That Glitters website, written by WMS Gaming, published on or before Nov. 2007.
Adders and Ladders Advertisement written by Barcrest Ltd., published prior to 2000. (2 pages).
Barn Yard Article, written by Strictly Slots, Aristocrat Technology, published Mar. 2002.
Bejeweled Web page, written by PopCap Games, http://www.popcap.com, published prior to Sep. 9, 2005.
Black Swan Paytable Display written by IGT, published prior to 2001.
Break the Spell Advertisement written by Atronic Casino Technology, Ltd., published in 1999.
Cash Chameleon Article written by Strictly Slots/Aristocrat Leisure Industries, PTY Ltd., published in Apr. 2001.
Catch a Wave Advertisement written by IGT, published in Dec. 2000.
Cossack Dance Advertisement written by Olympic Video Gaming, published prior to 2002.
Description of Expanding Symbol, written by IGT, published Sep. 1999.
Description of Gaming Machine with Animating Symbols, written by IGT, published Jan. 2000.
Description of Symbol Feature in Australian UFO Gaming Machine, written by Barcrest, Ltd., published 1995.
Description of Traveling Symbols, written by IGT, published Sep. 1999.
Double Diamond Line Advertisement written by Bally Gaming Systems, published in 2000.
Easy Street Advertisements and Articles, written by Casino Data Systems, published in 2000.
Enchanted Forest™ Gaming Description from Aristocrat, available in 1994.
Enchanted Unicorn Advertisement written by IGT, published in 2001.
Fishin' Buddies Article published in Strictly Slots/Anchor Games, published in Apr. 2001.
Ghoulish Gamble Article, written by Strictly Slots, IGT, Sep. 2000.
Gold Fever Advertisement, written by Atronic Casino Technology, Ltd., published 1999.
Gold Fever Atronic Web page, written by Atronic Casino Technology, published Mar. 2002.
Goooaal! pp. 1-2, written by Bally Gaming, Inc., published Dec. 2000.
It's a Blast, written by IGT, published on or before December of 2004.
Jewel in the Crown Advertisements, written by Barcrest Ltd., published 1999.
Joker's Wild Advertisement written by IGT, published prior to 2001.
"Juice Loot" by Bally Technologies, article from Strictly Slots, published Feb. 2008.
Kaboom Web page, written by WMS Gaming, http://www.wmsgaming.com/products/video/kaboom/index.php, published prior to Sep. 9, 2005.
Loco Loot Article written by Strictly Slots/Aristocrat Leisure Industries, Pty Ltd., published in May 2002.
Marshall Fey, Slot Machines a pictorial History of the First 100 Years, Liberty Bell Books, pp. 79, 150, 171, 231, published 1983.
Mountain Money Article written by Strictly Slots/Aristocrat Leisure Industries, Pty Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
Punch-a-Bunch/The Punch Board, [http://gscentral.net/punch.htm], pp. 1-6.
REEL MAGIC™ Gaming Machine Description written by IGT, available in 1986.
South Park Advertisement, written by IGT, published Sep. 1999.
Wild Bear Salmon Run Advertisement written by IGT, published in 2003.
Wild Streak Advertisement written by WMS Gaming, Inc., published in 2001.
Wolf Run Video Slots Advertisement, written by IGT, published prior in 2006.
Your Real Key to Gaming Success Advertisement (including Roll Over Beethoven and Wild Fortune) written by Olympic Video Gaming, published date unknown.
Letter from Marvin A. Motsenbocker of Mots Law dated Jul. 8, 2011 regarding Third Party Submission in Published Application Under 37 C.F.R. 1.99 filed for U.S. Appl. No. 12/615,869 (1 page).
Third Party Submission in Published Application Under 37 C.F.R. 1.99 filed for U.S. Appl. No. 12/615,869, dated Jul. 8, 2011 (3 pages).

GAMING SYSTEM, GAMING DEVICE, AND METHOD FOR PROVIDING A CASCADING SYMBOL GAME INCLUDING SHIFTING SYMBOLS ACCORDING TO DIRECTIONAL INDICATORS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. These gaming machines generally require the player to place or make a wager to activate the primary or base game. In many of these gaming machines, the award is based on the player obtaining a winning symbol or winning symbol combination and on the amount of the wager (e.g., the higher the wager, the higher the award). Generally, symbols or symbol combinations which are less likely to occur result in higher awards. In such known gaming machines, the amount of the wager made on a play of the base game by the player can vary.

Gaming machines which provide cascading symbol games are also known. In one such cascading symbol game, a gaming machine generates and displays a plurality of symbols in a plurality of symbol positions. The gaming machine evaluates the displayed symbols and provides an award for each winning symbol combination formed. The gaming machine then removes the displayed symbols that form the winning symbol combination(s), creating one or more empty symbol positions. The gaming machine shifts zero, one, or more of the remaining displayed symbols downward into zero, one, or more of the empty symbol positions. If any empty symbol positions remain after this downward shifting, the gaming machine generates and displays a symbol for each empty symbol position. The gaming machine reevaluates the displayed symbols and provides an award for any winning symbol combinations formed. The gaming machine repeats the steps of removing generated symbols, shifting generated symbols, generating new symbols if winning symbol combinations continue to be formed, and evaluating generated symbols.

There is a need to increase the excitement and entertainment experienced by people playing gaming machines. There is also a need for new ways of providing better gaming experiences and environments at gaming machines. There is a further need for increasing the number of winning symbol combinations generated and the number and values of the awards provided to a player for a single wager on a play of a game.

SUMMARY

Various embodiments of the present disclosure relate generally to gaming systems, gaming devices, and methods for providing a game wherein one or more symbols which are part of a winning symbol combination are shifted within an arrangement of symbols (such as a matrix) according to a directional indicator associated with each symbol. The shifting of symbols within the arrangement of symbols results in each shifted symbol being removed from its original symbol position, and may also result in at least one symbol which is not included in any of the winning symbol combinations being removed from its original symbol position. Therefore, the disclosed gaming system provides a game wherein the shifting of a single symbol associated with a directional indicator can result in a plurality of empty symbol positions, some of which were not included in any winning symbol combination. The gaming system increases player excitement and enjoyment because each symbol which is part of a winning symbol combination may be a shifted symbol which represents an opportunity to remove not only that shifted symbol, but also one or more additional symbols not included in any of the winning symbol combinations, from the arrangement of symbol positions. The gaming system further increases player excitement and enjoyment because each empty symbol position generated during the play of the game represents an opportunity to generate an additional symbol (such as an additional high-value symbol) and therefore one or more additional winning symbol combination for a play of the game. Thus, in certain embodiments and with certain configurations of symbols, the gaming system increases the probability of receiving additional winning symbol combinations and/or of receiving winning symbol combinations associated with higher award values, for a single play of the game.

More particularly, various embodiments of the present disclosure relate to a gaming system that enables a player to play a game in which symbols are shifted within an arrangement of symbol positions. For the play of the game, the gaming system displays a randomly generated symbol in each of the symbol positions of the arrangement of symbol positions. The gaming system displays at least one symbol in association with a directional indicator which indicates or establishes a shift direction for that symbol. If any winning symbol combinations are displayed, the gaming system provides an award to a player. The gaming system also determines whether to shift any of the displayed symbols. In one embodiment, the gaming system determines to shift any symbols which are both (a) included in a winning symbol combination, and (b) associated with a directional indicator. The gaming system shifts any such determined symbols along shift paths according to any directional indicators respectively associated with such symbols. In one embodiment, depending on the positions of the symbols, as the gaming system shifts each determined symbol, the gaming system removes or otherwise alters at least one non-shifted symbol in the shift path of the shifting symbol. In one embodiment, the gaming system also removes each symbol of each winning symbol combination which is not associated with a directional indicator. The gaming system thereafter fills any empty symbol positions by shifting then-displayed symbols into the empty symbol positions and/or by displaying newly generated symbols in the empty symbol positions. In one embodiment, the gaming system repeats this determination of winning symbol combinations, providing awards, shifting according to directional indicators, removal, and filling of empty symbol positions, until no winning symbol combinations are generated.

In various embodiments, one, a plurality of, or each of the symbols generated for the play of the game is associated with a directional indicator. In one such embodiment, the plurality of symbols are each stored in association with a particular directional indicator. In this embodiment, each time a symbol stored in association with a directional indicator is displayed, the directional indicator associated with that symbol is also displayed. In another such embodiment, the gaming system generates a plurality of symbols which are not initially associated with directional indicators and thereafter independently or separately determines whether to associate any directional indicator with each of the generated and displayed symbols. In this embodiment, the gaming system determines whether to associate at least one directional indicator with at least one symbol, and also determines which particular directional indicator to associate with that symbol, for the play of the game.

The disclosed gaming system determines which (if any) displayed symbols to shift during the play of the game. In one embodiment, the gaming system determines that one or more symbols contained in one or more winning symbol combinations should be shifted for the play of the game. In one embodiment, the gaming system also determines whether a symbol of a winning symbol combination is associated with a directional indicator prior to shifting such a symbol. Thus, if a symbol is both (a) contained in a winning symbol combination, and (b) associated with a directional indicator, the gaming system shifts that symbol for the play of the game. In another embodiment, the gaming system shifts at least one symbol which is associated with a directional indicator regardless of whether that symbol is included in any winning symbol combination.

In one embodiment, the gaming system shifts at least one symbol in a shift direction as defined by the directional indicator associated with that symbol. In one embodiment, the gaming system displays the directional indicator as an arrow, and the shift direction is defined according to a direction in which the arrow is pointing. In one embodiment, the gaming system shifts the symbol along a shift path as identified by the directional indicator. For example, if a symbol is displayed in a left-most column of a symbol matrix, and the symbol is associated with a directional indicator displayed as a right-pointing arrow, the shift path indicates left-to-right motion along the row in which that symbol was originally displayed. In this embodiment, the symbols initially displayed to the right of the shifted symbol are in the shift path of the shifting symbol.

In one embodiment, the gaming system displays a shifting symbol as interacting with at least one of the symbols in the shift path of that shifting symbol. In one embodiment, the gaming system displays such interaction by removing the interacted-with symbol from the arrangement of symbols. For example, the gaming system removes each symbol in the shift path of the shifting symbol. In another example, the gaming system displays the interaction by altering either or both of the shifting symbol and the interacted-with symbol.

Alternatively, for at least one interacted-with symbol in the shift path, such as one or more relatively high-value symbols, the gaming system does not remove or otherwise alter that interacted-with symbol during shifting. In one such embodiment, the gaming system determines whether to remove or otherwise alter an interacted-with symbol based on that symbol itself. For example, the gaming system does not remove or alter one or more high-value symbols displayed for the play of the game. In this example, the gaming system provides players with additional opportunities to win high-value awards by removing relatively lower-value symbols and by maintaining relatively high-value symbols, regardless of which symbols shift for the play of the game. Moreover, in this embodiment, the gaming system provides the player with a better probability of obtaining additional shifting symbols and therefore additional winning symbol combinations for a single play of the game. In another embodiment, the shifting symbol interacts with at least one symbol in the shift path by changing the shift direction of the shifting symbol upon the shifting symbol encountering the interacted-with symbol.

In one embodiment, the gaming system removes at least one symbol which is not associated with a directional indicator from a winning symbol combination. In one such embodiment the gaming system removes each symbol of each winning symbol combination, whether by shifting such a symbol out of the winning symbol combination (i.e., if the symbol is associated with a directional indicator) or by removing the symbol from the winning symbol combination (i.e., if the symbol is not associated with a directional indicator).

After shifting and removing the appropriate symbols for the play of the game, the gaming system fills any empty symbol positions resulting from such shifting. In one embodiment, the gaming system fills at least one empty symbol position by shifting at least one generated symbol into an adjacent empty symbol position. In one embodiment, after shifting any appropriate symbols to fill empty symbol positions, the gaming system generates and displays one of the plurality of symbols in any then-empty symbol position. Such a generation and display can represent an opportunity to generate additional symbols associated with a directional indicator and/or additional high-value symbols for the play of the game.

The gaming system repeats the described process until a designated ending condition occurs. In one embodiment, the designated ending condition occurs when no winning symbol combinations are displayed. For example, after filling any empty symbol positions as described, the gaming system determines whether the then-displayed symbols form any additional winning symbol combinations. If so, the gaming system provides an award for the additional winning symbol combination(s), determines whether to shift any additional symbols based on their associated directional indicator(s), removes any non-shiftable symbols from the winning symbol combination(s), and fills any resulting empty symbol positions, as described above. Alternatively, the designated ending condition can occur after a designated number of repetitions of the process described above. In either case, this repetition increases player excitement and enjoyment by providing players with additional opportunities to generate winning symbol combinations for a single play of the game.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
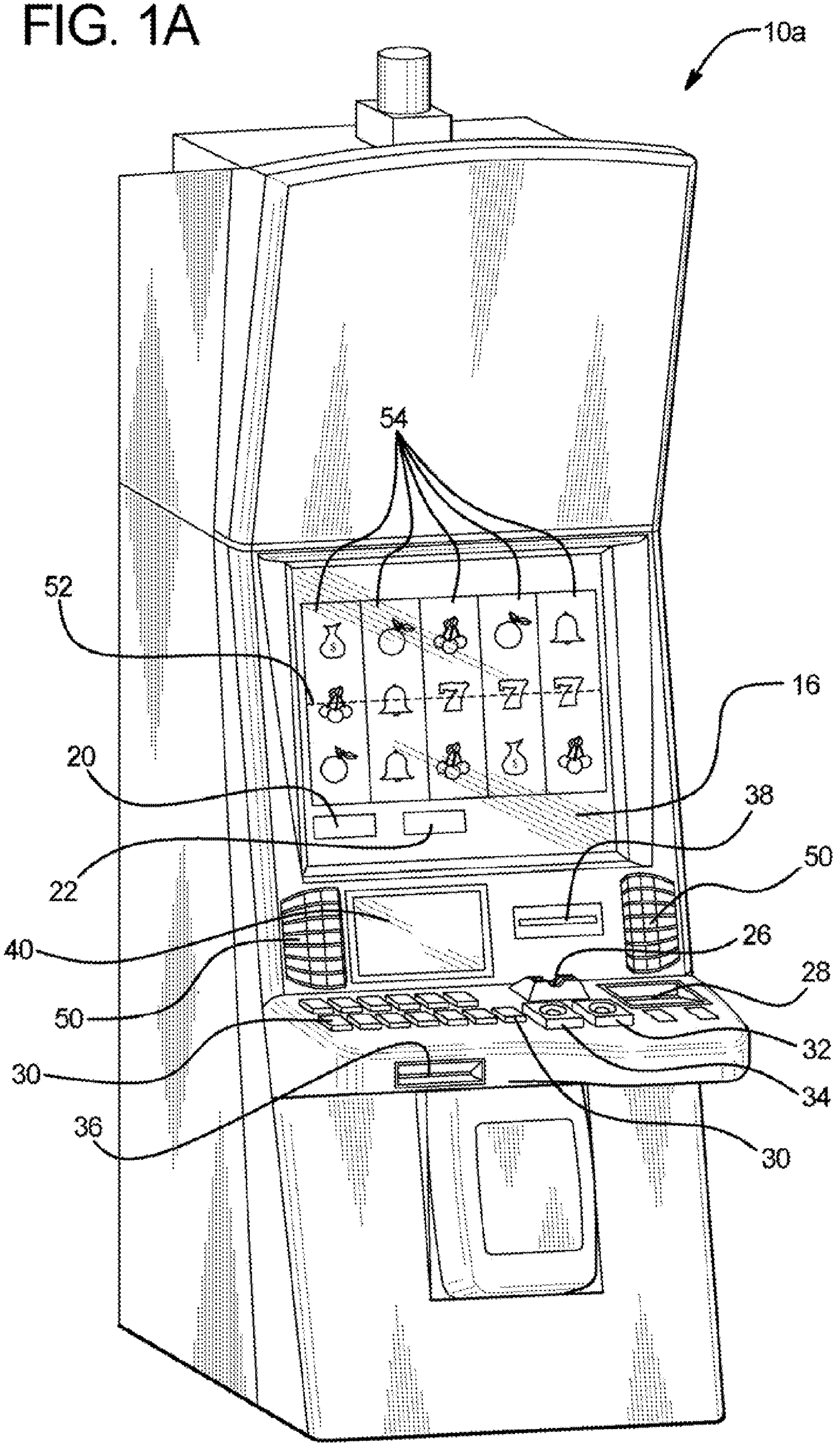
FIGS. 1A and 1B are perspective views of example alternative embodiments of the gaming device of the present disclosure.
Figure 1B:
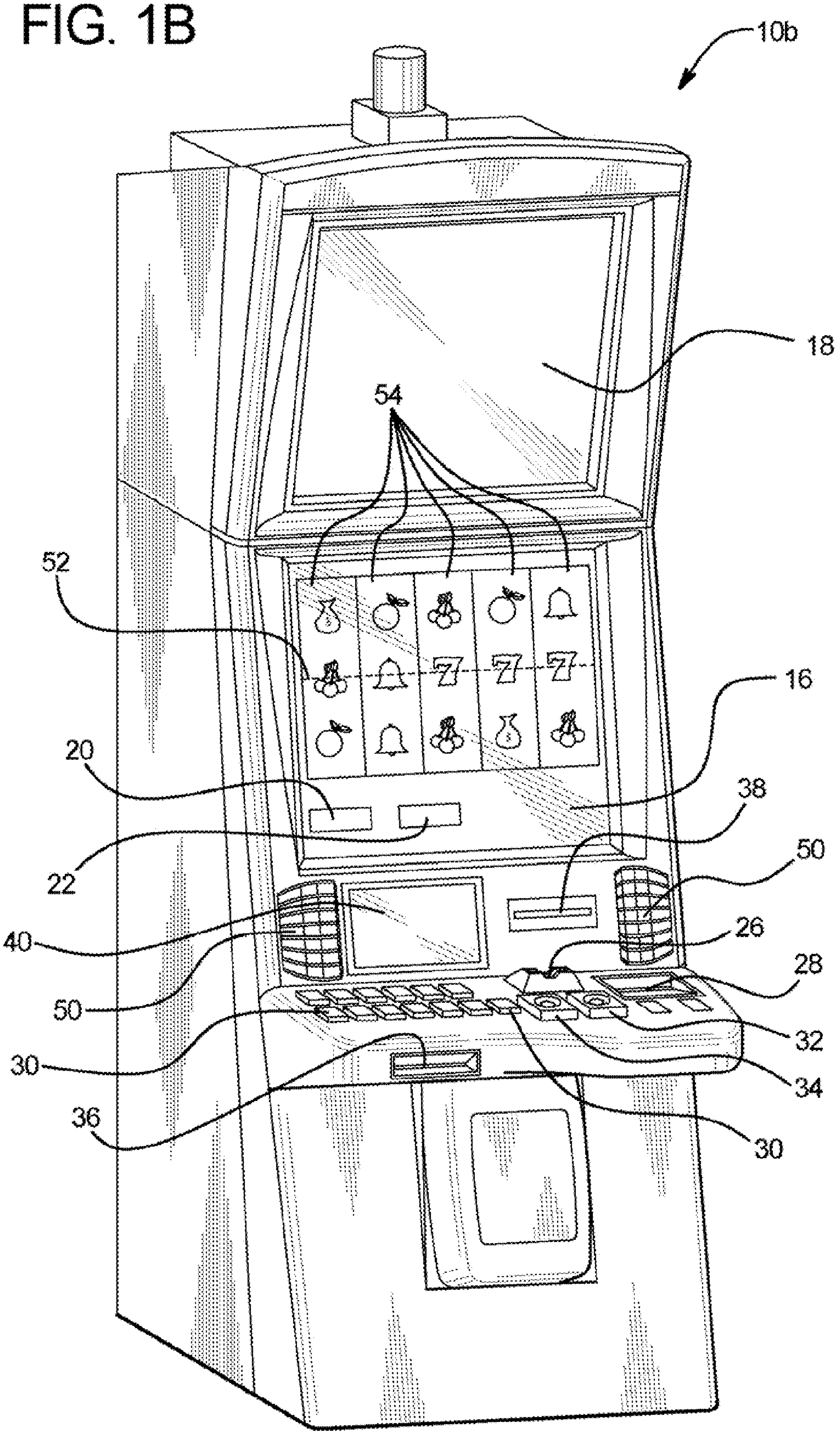

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
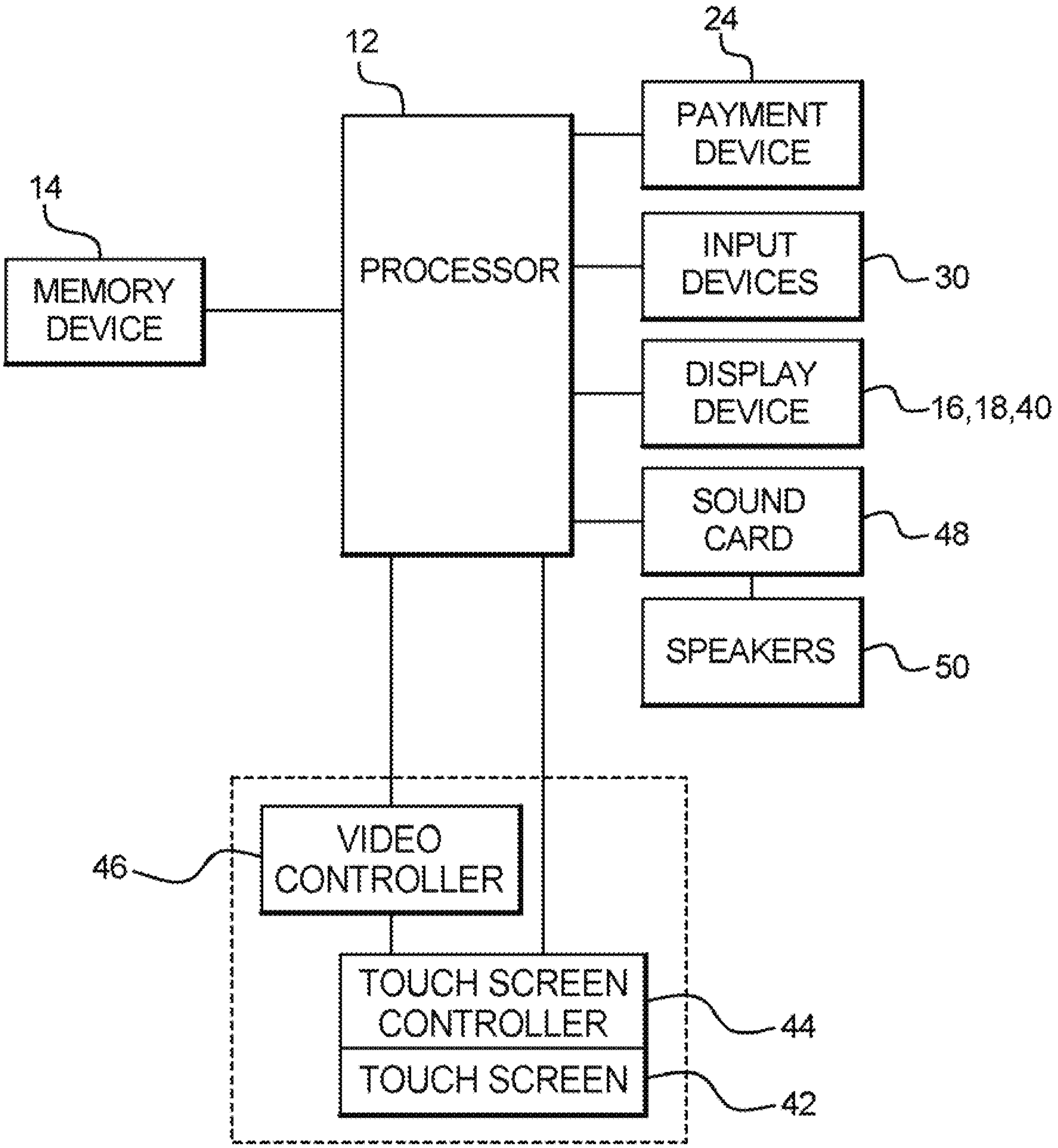
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
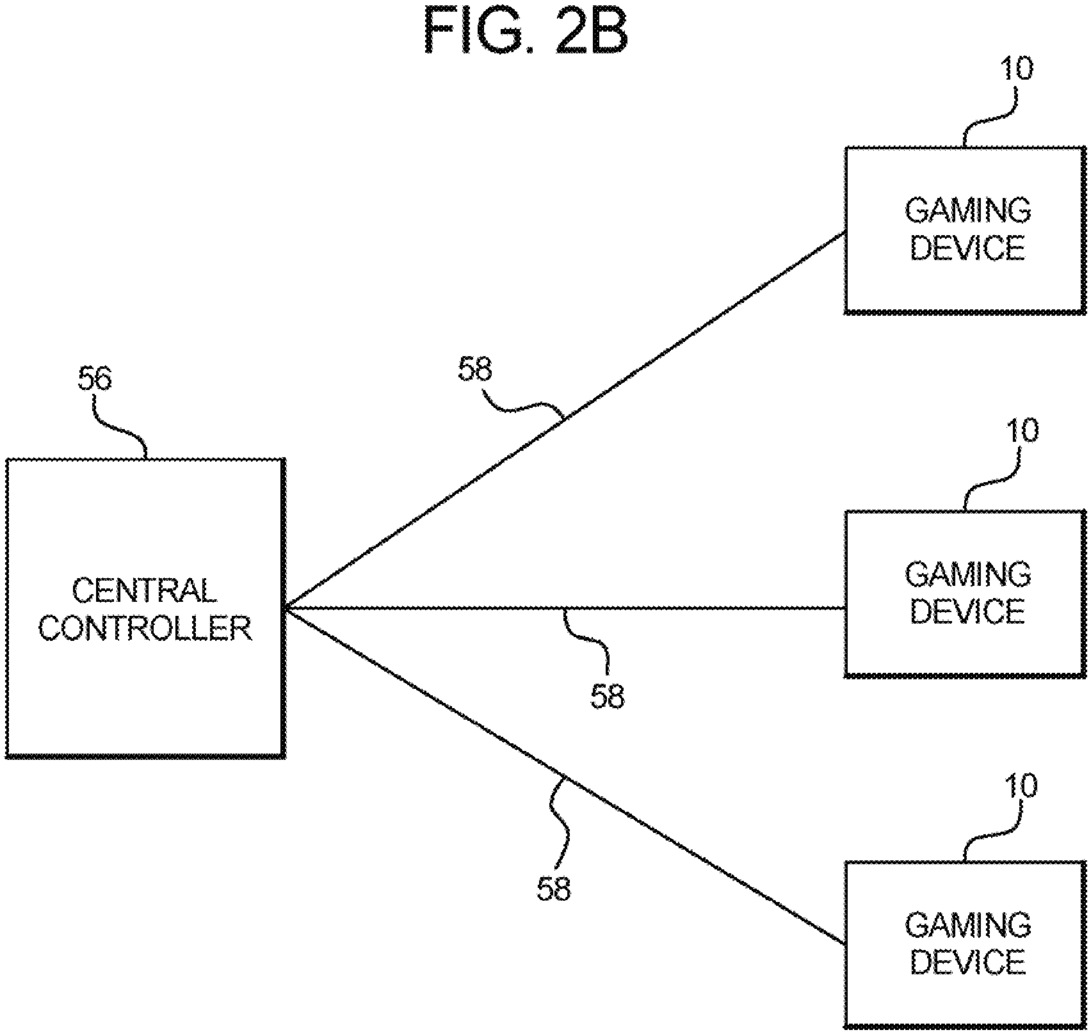
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one Internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Including Shifting Symbols According to Directional Indicators Associated with the Symbols In one embodiment, the gaming system disclosed herein displays an arrangement of symbol positions and displays a randomly generated one of a plurality of symbols in each symbol position for a play of a game. In one embodiment, at least one of the displayed symbols is associated with a directional indicator. If any winning symbol combinations are displayed, the gaming system provides an award to the player and shifts at least one symbol according to a directional indicator associated with that symbol. In one embodiment, the gaming system shifts such a symbol according to a shift path defined by the directional indicator associated with the symbol to be shifted. In one embodiment, as the gaming system shifts a symbol, the gaming system displays the symbol as interacting with at least one other symbol encountered during shifting, such as by removing the interacted-with symbol from the arrangement of symbols. In one embodiment, the gaming system also removes at least one symbol of at least one winning symbol combination which is not associated with a directional indicator. After shifting, the gaming system fills the empty symbol positions by shifting symbols within the arrangement of symbols and/or by randomly generating symbols to fill the then-empty symbol positions. In one embodiment, the gaming system repeats the determination of winning symbol combinations, shifting according to directional indicators, removal of symbols, and filling of empty symbol positions, until a designated ending condition occurs.

Figure 3:
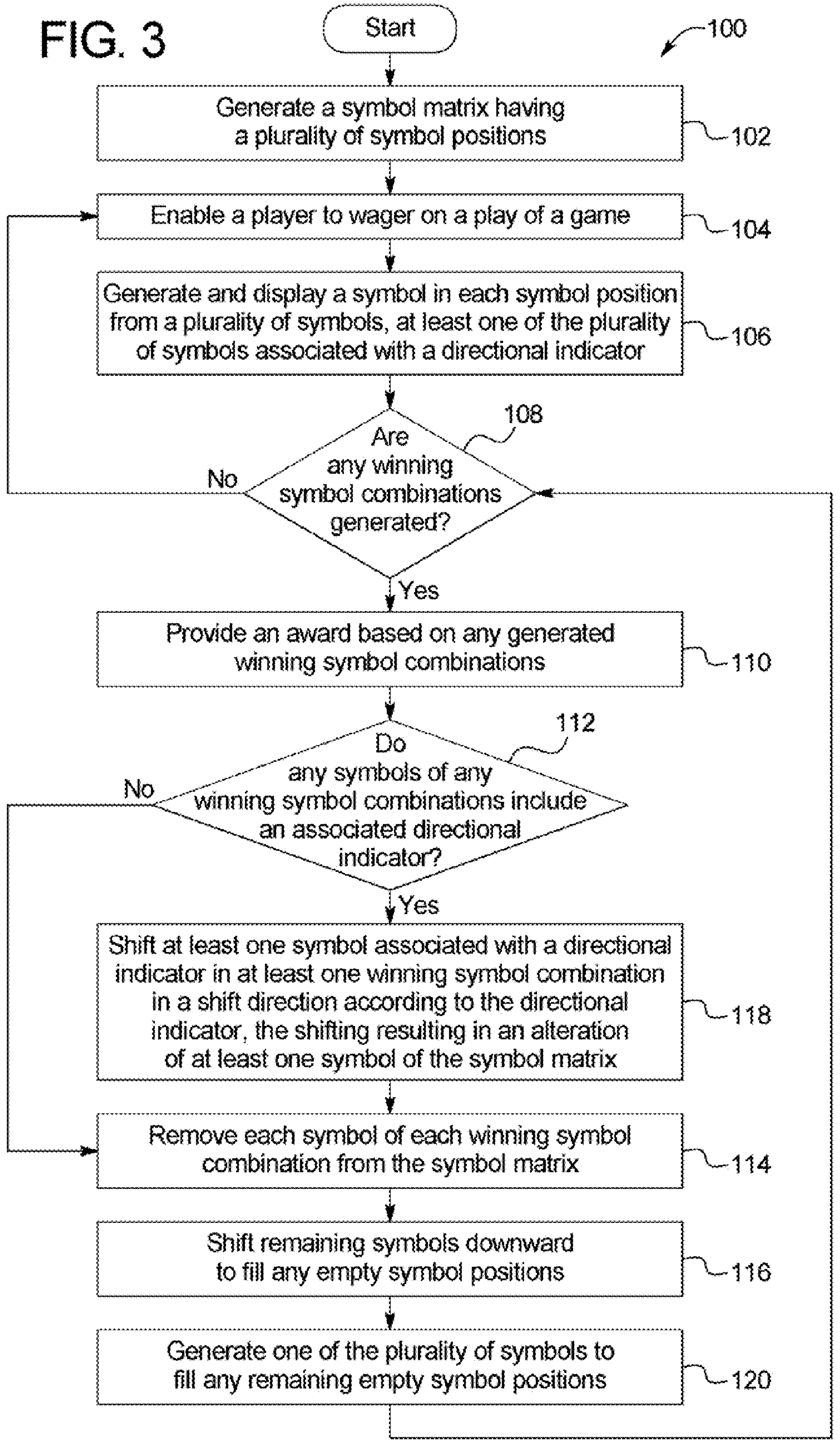
FIG. 3 is a flow chart of an example process for operating the gaming system disclosed herein.

FIG. 3 illustrates a flow chart of an example process 100 for operating gaming system disclosed herein. Although the example process 100 for operating the gaming system is described with reference to the flow chart illustrated in FIG. 3, many other methods of operating a gaming system are contemplated. For example, the order of certain of the steps of process 100 may be changed, and certain of the steps of process 100 are optional.

Upon the beginning of a play of the game disclosed herein, the gaming system generates an arrangement of symbol positions, such as a symbol matrix having a plurality of symbol positions, as indicated by block 102. For example, the gaming system generates a symbol matrix having a plurality of rows and a plurality of columns, such as a matrix having three rows and five columns. In one embodiment, the gaming system does not immediately display the symbol matrix, such that the player does not see a matrix of empty symbol positions for a play of the game. The gaming system enables a player to wager on a play of a game, as indicated by block 104. For the play of the game, the gaming system thereafter displays one of a plurality of symbols in each symbol position of the symbol matrix, as indicated by block 106.

In one embodiment, at least one symbol displayed in the symbol matrix includes an associated directional indicator. It should be appreciated that the gaming system can display the associated directional indicator as an arrow associated with the at least one symbol. In one embodiment, the gaming system generates symbols for display in the symbol matrix from a plurality of symbols, wherein at least one of the plurality of symbols is associated with a directional indicator. In this embodiment, each time the gaming system generates that symbol for display in the symbol matrix, the symbol is displayed in association with a directional indicator.

After generating the plurality of symbols, the gaming system determines whether any winning symbol combinations are generated, as indicated by diamond 108. If no winning symbol combinations have been generated, the gaming system ends the play of the game and enables the player to wager again on a new play of the game, as indicated by block 104.

If the gaming system determines that at least one winning symbol combination is generated, as indicated by diamond 108, the gaming system provides an award to the player based on that winning symbol combination, as indicated by block 110. The gaming system also determines whether any of the symbols of any winning symbol combination are associated with a directional indicator, as indicated by diamond 112.

If none of the symbols of any of the winning symbol combinations are associated with such a directional indicator, as indicated in diamond 112, the gaming system operates as a standard cascading symbol game. That is, the gaming system removes any symbols contained in any winning symbol combination from the arrangement of symbols, as indicated by block 114, and fills the resulting empty symbol positions by shifting remaining symbols downward to fill the empty symbol positions, as indicated by block 116.

In the illustrated embodiment, if the gaming system determines that at least one symbol of at least one winning symbol combination is associated with a directional indicator, as indicated by diamond 112, the gaming system shifts such symbol(s) according to the associated directional indicator. Specifically, the gaming system shifts at least one symbol associated with a directional indicator in a shift direction indicated by the directional indicator, as indicated by block 118. For example, if the directional indicator indicates a shift direction to the right (e.g., the directional indicator is displayed as an arrow pointing to the right), the gaming system shifts that symbol from its current position in the symbol matrix to the right within the symbol matrix. In this embodiment, the shifting of a symbol according to a directional indicator results in an alteration of at least one symbol of the symbol matrix, as indicated by block 118. In one embodiment, the alteration includes removing at least one symbol from the symbol matrix. In another embodiment, the alteration includes changing at least one symbol of the symbol matrix to another symbol. In other embodiments, the alteration includes moving at least one symbol to a different position of the symbol matrix, changing the shift direction of at least one shifting symbol within the symbol matrix, or adding at least one directional indicator to at least one symbol that was not previously associated with a directional indicator.

Following the shifting according to any directional indicators as described above with respect to block 118, the gaming system removes any symbols of any winning symbol combinations which are not associated with a directional indicator, as indicated by block 114. The gaming system thereafter shifts any remaining symbols downward as appropriate to fill the empty symbol positions created by removing and/or shifting according to directional indicators, as indicated by block 116.

After the shifting and removal described in blocks 118 and 114, the disclosed gaming system generates one of the plurality of symbols to fill each of any then-displayed empty symbol positions, as indicated by block 120. After filling each empty symbol position, the gaming system again determines whether any winning symbol combinations are generated, as indicated by diamond 108. If any winning symbol combinations are generated, the gaming system provides an award, as indicated by block 110, shifts any symbols according to any directional indicators, and removes any other symbols of any winning symbol combinations, as described above. The gaming system repeats this process until no winning symbol combinations are generated, as indicated by diamond 108, and thereafter enables the player to wager on another play of the game, as indicated by block 104.

It should be appreciated that in the illustrated process 100, the ending condition applied by the gaming system is whether at least one winning symbol combination is displayed. That is, as illustrated y block 108, the gaming system continues each play of the game so long as one or more winning symbol combinations are generated. In other embodiments, the ending condition could be implemented by making a different determination following block 120, such as a determination as to whether any displayed symbols are associated with a directional indicator, or a determination about how many times the process 100 has previously been repeated.

In the illustrated embodiment, the gaming system shifts symbols which are included in one or more winning symbol combinations and are also associated with a directional indicator. In another embodiment, the gaming system shifts at least one symbol which is associated with a directional indicator even if it is not included in a winning symbol combination.

Moreover, in the illustrated embodiment, after shifting one or more symbols based on one or more directional indicators, as indicated by block 118, and removing any symbols of any winning symbol combinations not associated with any directional indicator, as indicated by block 114, the gaming system operating according to process 100 fills any then-displayed empty symbol positions by first shifting symbols downward to fill empty symbol positions, as indicated in block 116, and thereafter displaying randomly generated symbols in the remaining empty symbol positions, as indicated by block 120. In another embodiment, the gaming system does not perform any shifting prior to generating new symbols to fill empty symbol positions. In this embodiment, the gaming system simply displays a randomly generated symbol in each empty symbol position, regardless of where in the symbol matrix that empty symbol position is located. In another embodiment, the gaming system shifts one or more symbols upward or laterally prior to displaying a randomly generated symbol in an empty symbol positions. Any appropriate mechanism for filling empty symbol positions is contemplated by the instant disclosure.

In one embodiment, the gaming system disclosed herein is configured not to remove at least one symbol from a winning symbol combination, even if that symbol is not associated with a directional indicator. For example, one or more high-valued symbols, such as one or more major symbols, may be configured to remain in the symbol matrix even if the symbol is a part of a winning symbol combination or is in a shift path of a shifting symbol. In this embodiment, the gaming system operates as described with respect to process 100 described above, but when the process indicates that such a non-removable symbol is to be removed, the gaming system simply skips that removal step.

FIGS. 4A, 4B, 4C, 4D, 4E, 4F, 4G, 4H, and 4I are front elevation views of a display device of one embodiment of the gaming system disclosed herein. Specifically, the gaming system illustrated in FIGS. 4A, 4B, 4C, 4D, 4E, 4F, 4G, 4H, and 4I operates according to the process 100 described above with respect to FIG. 3.

In the embodiment illustrated in FIGS. 4A, 4B, 4C, 4D, 4E, 4F, 4G, 4H, and 4I, the gaming system displays a screen 150 of an appropriate display device, such as the display device 16 of the gaming device illustrated in FIG. 1A. In the illustrated embodiment, the screen 150 includes a symbol matrix 160 having a plurality of symbol positions arranged as a plurality of rows and a plurality of columns of symbol positions. Specifically, the symbol matrix 160 includes three rows of symbol positions 164*a*, 164*b*, and 164*c*, each row having five columns of symbol positions 162*a*, 162*b*, 162*c*, 162*d*, and 162*e*. The gaming system also displays a game information display area 170, in which the gaming system displays messages to a player about the status of a play of the game. Finally, the gaming system displays an award display area 180, in which the gaming system displays the player's accumulated award for a play of the game.

In the illustrated embodiment, the gaming system is configured to randomly generate one of a plurality of symbols in each of the plurality of symbol positions for the play of the game. Specifically, the gaming system is configured to generate symbols selected from the group consisting of 9 symbols, 10 symbols, J symbols, Q symbols, K symbols, A symbols, M2 symbols, and M1 symbols. In the illustrated embodiment, each of the 9 symbols, the 10 symbols, the J symbols, the Q symbols, the K symbols, and the A symbols is associated with a directional indicator, displayed as an arrow in the lower-right corner of a symbol position containing that symbol. Further, in the illustrated embodiment, neither the M2 symbol nor the M1 symbol are associated with a directional indicator. In this embodiment, the M2 symbols and the M1 symbols are relatively high-value symbols—that is, winning symbol combinations which include either M2 symbols or M1 symbols are associated with awards having relatively higher values than the awards associated with winning symbol combinations not including M2 symbols or M1 symbols. Thus, the illustrated embodiment of the gaming system disclosed herein is configured to potentially shift the plurality of relatively low-value symbols (i.e., the 9 symbols, 10 symbols, J symbols, Q symbols, K symbols, or A symbols) according to the associated directional indicators, but is configured not to shift the relatively high-value symbols (i.e., the M2 symbols or M1 symbols).

In the embodiment illustrated in FIGS. 4A, 4B, 4C, 4D, 4E, 4F, 4G, 4H, and 4I, the gaming system is configured to shift each symbol of each winning symbol combination which is associated with a directional indicator according to the direction of the directional indicator. Thus, if a directional indicator associated with a particular symbol is pointing downward, and if that symbol is included in a winning symbol combination, the gaming system shifts the symbol downward in the same column in which the symbol was originally displayed. Likewise, if a directional indicator is pointing to the right, and the symbol is included in a winning symbol combination, the gaming system shifts the symbol to the right in the same row in which the symbol was originally displayed.

In the illustrated embodiment, the gaming system shifts any appropriate symbols in the direction indicated by the directional indicator until the shifted symbol is removed from the symbol matrix. Thus, a symbol associated with a downward-pointing directional indicator will be shifted downward in the column in which it was originally displayed until it is shifted off of or out of the bottom of the symbol matrix. Likewise, a symbol associated with a right-pointing directional indicator will be shifted to the right in the row in which it was original displayed until it is shifted off or out of the right side of the symbol matrix.

In the illustrated embodiment, the gaming system is configured to alter symbols of the symbol matrix during shifting by removing symbols which are encountered by or are in the shift path of any shifting symbols. Specifically, the gaming system is configured to remove symbols in a shift path so long as those symbols are not M2 or M1 symbols. In the illustrated embodiment, if either an M2 symbol or an M1 symbol is in the shift path of a shifting symbol, the gaming system does not remove or otherwise alter that M2 or M1 symbol.

In the illustrated embodiment, following any removal of any symbols, the gaming system is configured to shift each symbol of the symbol matrix downward as far as possible to fill any empty symbol positions, regardless of which symbol is being shifted downward. That is, following the shifting according to the directional indicators as described above, the gaming system will shift any symbol, including an M2 symbol or an M1 symbol, downward if an empty symbol position is displayed below that symbol. After this downward shifting, the gaming system displays a randomly generated symbol in each of the then-empty symbol positions prior to determining whether any new winning symbol combinations are displayed. Thus, in the illustrated embodiment, the gaming system is relatively likely to display a plurality of M2 and/or M1 symbols in the lower portion of the symbol matrix, as those symbols cannot be shifted out of the symbol matrix but can be shifted downward to fill any otherwise created empty symbol positions.

Figure 4A:
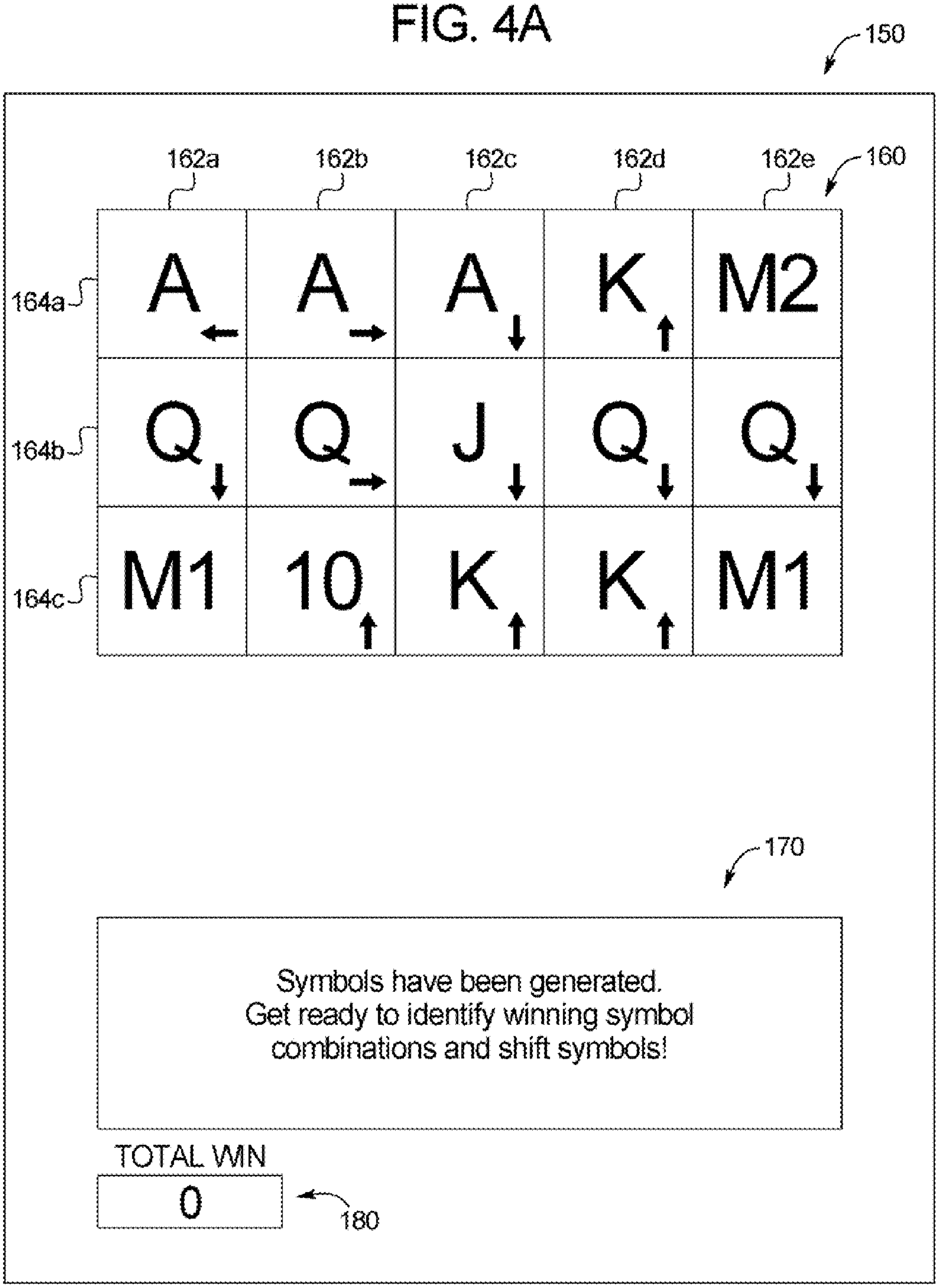
FIGS. 4A, 4B, 4C, 4D, 4E, 4F, 4G, 4H, and 4I are front elevation views of one embodiment of a display device of the gaming system disclosed herein.

Referring now to FIG. 4A, the gaming system disclosed herein is illustrated at a point in time after the player has wagered on a play of the game disclosed herein, and after the gaming system has generated a plurality of symbols in the symbol matrix 160. Specifically, the gaming system has randomly generated a plurality of symbols associated with directional indicators, and has generated an M1 symbol and two M2 symbols which are not associated with directional indicators. The gaming system displays a message in game information display area 170 indicating that the symbols have been randomly generated, and that winning symbol combinations will be determined and any appropriate symbols will be shifted. The award display area 180 is labeled as TOTAL WIN, and displays a cumulative amount won for a play of the game. In the illustrated embodiment, the award display area 180 displays an award of zero, indicating that at the point in time illustrated in FIG. 4A, the player has not yet won an award for the play of the game.

Figure 4B:
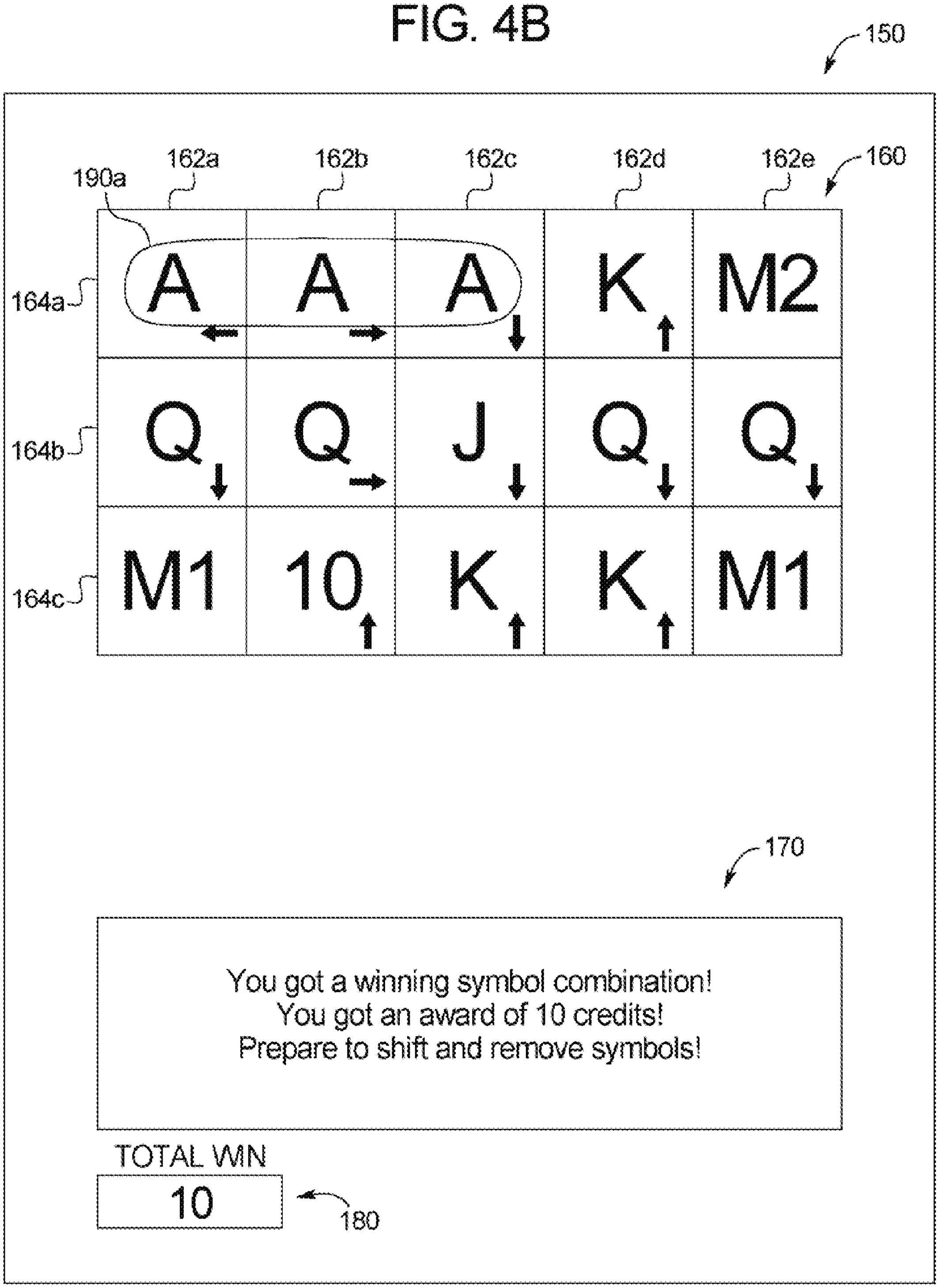

FIG. 4B illustrates the gaming system disclosed herein at a point in time after a determination has been made as to whether any winning symbol combinations are displayed. Specifically, in the illustrated embodiment, the gaming system indicates that a single winning symbol combination 190*a* is displayed along the top row 164*a* of the symbol matrix 160. The winning symbol combination includes three A symbols, each associated with a different directional indicator. In the illustrated embodiment, the game information display area 170 displays a message to the player indicating that a winning symbol combination has been generated, and that the winning symbol combination is associated with an award of ten credits. Thus, the award display area 180 displays an accumulated award (i.e., a TOTAL WIN) of ten credits for the play of the game. Moreover, the game information display area 170 indicates to the player that the gaming system will shift symbols and remove the appropriate symbols in the symbol paths.

Figure 4C:
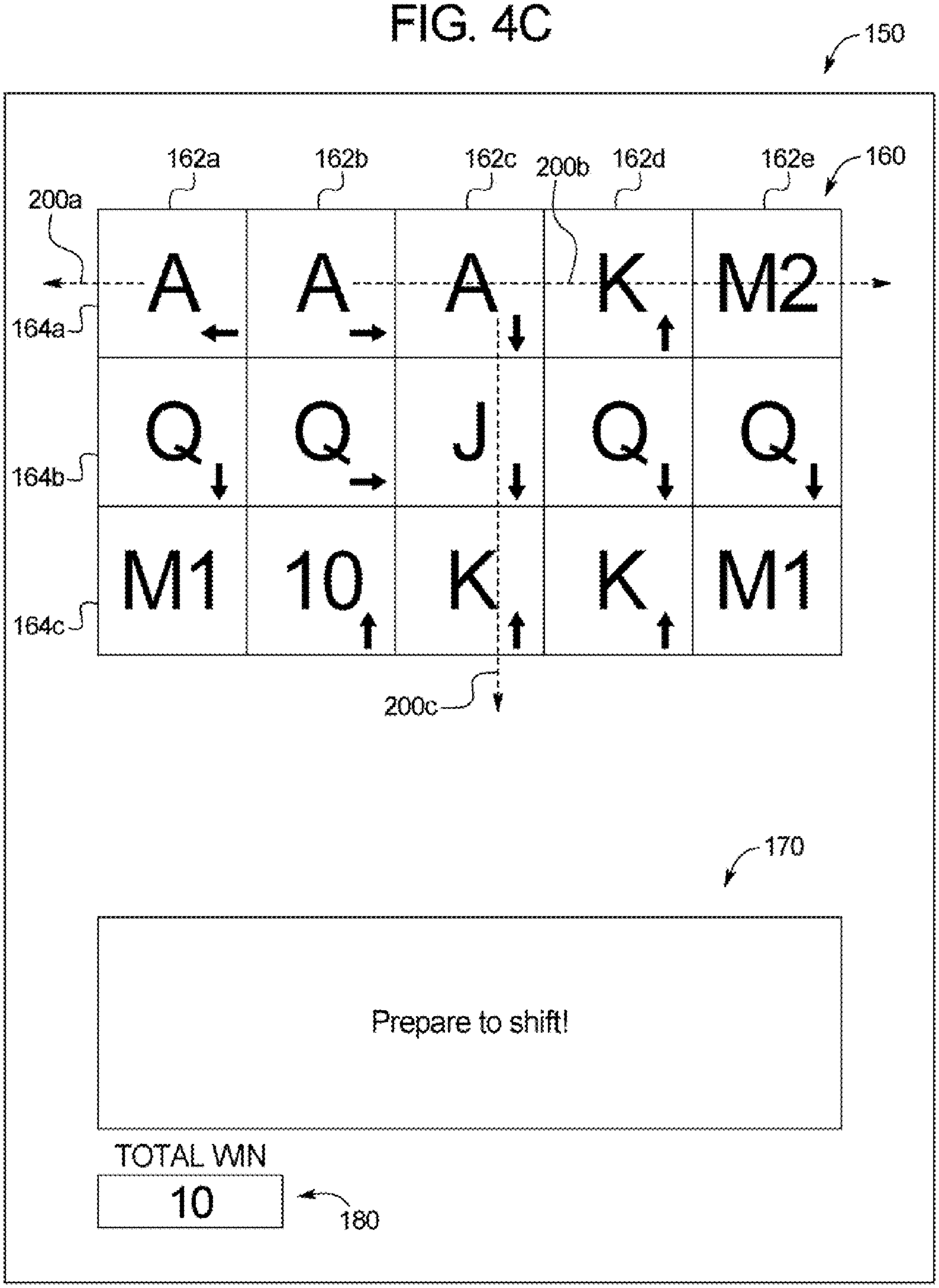

Referring now to FIG. 4C, the gaming system disclosed herein is displayed at a point in time after determining that the symbols at row 164*a* and column 162*a*, row 164*a* and column 162*b*, and row 164*a* and column 164*c* will be shifted according to the directional indicators associated with each of those symbols. In the illustrated embodiment, dashed lines 200*a*, 200*b*, and 200*c* indicate the shift paths of the three symbols to be shifted as defined by the directional indicators of those symbols. Specifically, dashed line 200*a* indicates that the symbol at row 164*a* and column 162*a* will be shifted to the left and removed from the symbol matrix. Dashed line 200*b* indicates that the symbol at row 164*a* and column 162*b* will be shifted to the right within row 164*a* until it is shifted out of the symbol matrix. Dashed line 200*c* indicates that the symbol at row 164*a* and column 162*c* will be shifted downward within column 162*c* until it is removed from the symbol matrix. In the illustrated embodiment, the game information display area 170 displays a message indicating that the symbols will begin shifting, and the award display area displays an indication that the currently accumulated award for the player remains ten credits.

In one embodiment, the gaming system displays dashed lines or other appropriate indicators, such as dashed lines 200*a*, 200*b*, and 200*c*, to indicate the direction of shifting. In another embodiment, the gaming system does not display such dashed lines. In such an embodiment, the dashed lines illustrated in FIG. 4C are merely indicative of the shifting path, but are not actually displayed in the screen 150.

In the embodiment illustrated in FIG. 4C, as each of the symbols of the winning symbol combination 190*a* shifts along the indicated shift path, the symbol will interact with encountered symbols of the symbol matrix by causing the encountered symbols to either be removed from the symbol matrix (if the encountered symbol is a 9 symbol, a 10 symbol, a J symbol, a Q symbol, or a K symbol) or to remain unaltered (if the encountered symbol is an M2 symbol or an M1 symbol).

Figure 4D:
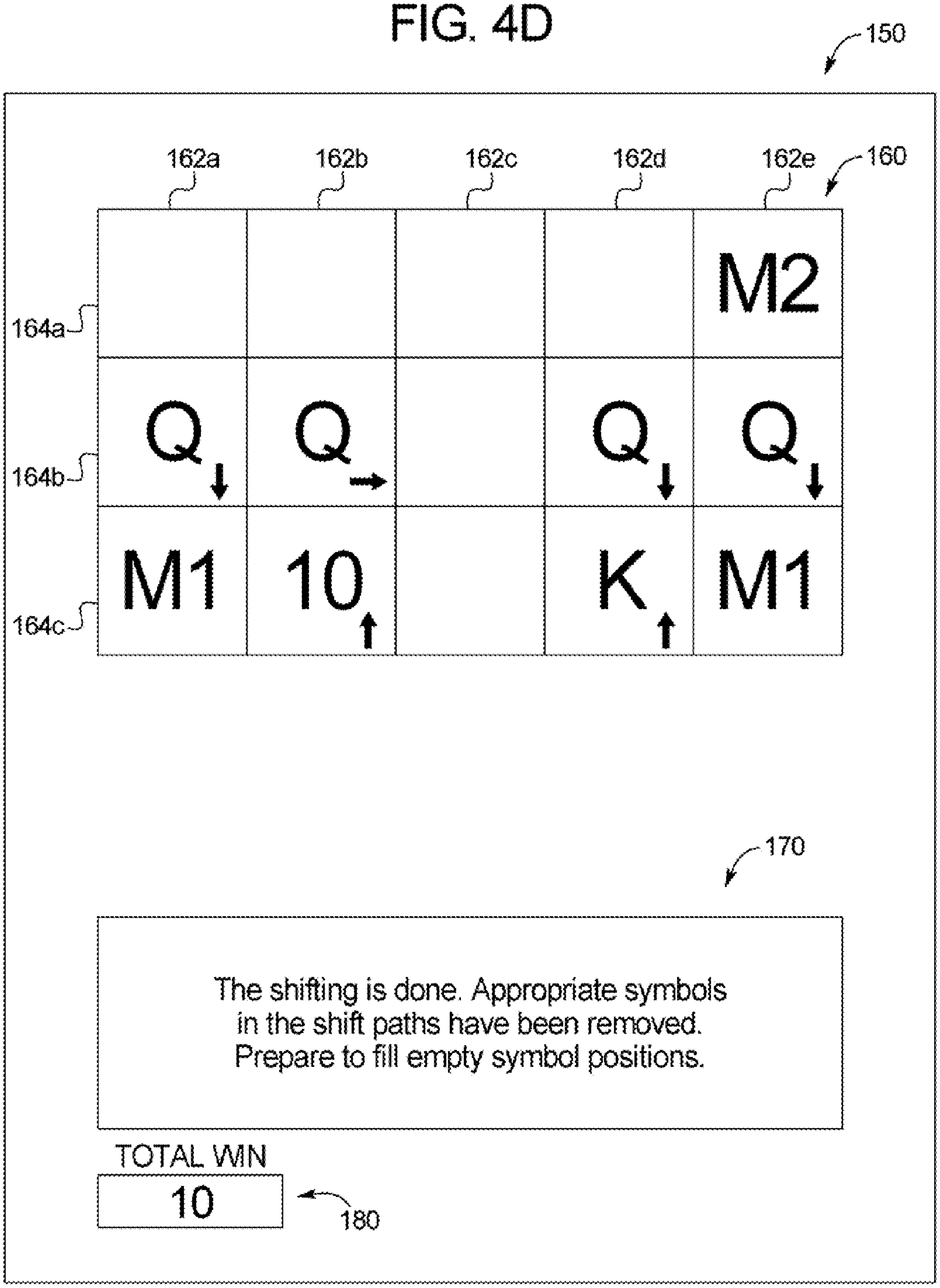

FIG. 4D illustrates the disclosed gaming system at a point in time following the shifting of symbols as described in FIG. 4C. Specifically, as illustrated in FIG. 4D, after shifting the symbols of the winning symbol combination 190*a* according to the shift paths illustrated by dashed lines 200*a*, 200*b*, and 200*c*, the gaming system displays four empty symbol positions in row 164*a*, one empty symbol position in row 164*b*, and one empty symbol position in row 164*c*. In the illustrated embodiment, the game information display area 170 indicates that the shifting is complete, and that any appropriate symbols in the shift paths have been removed from the symbol matrix. Moreover, the game information display area 170 indicates that the now-empty symbol positions will be populated or filled with symbols. Award display area 180 indicates that the accumulated award for the play of the game remains ten credits.

In the illustrated embodiment, despite the fact that the M2 symbol displayed at row 164*a* and column 164*e* was in the shift path 200*b* of one of the symbols of the winning symbol combination 190*a*, the gaming system did not remove that M2 symbol from the symbol matrix. Moreover, in the illustrated embodiment, six empty symbol positions are displayed based on the winning symbol combination which included only three symbols. It should thus be appreciated that the gaming system disclosed herein enables a relatively large number of symbols to be removed from the symbol matrix based on a winning symbol combination including only a relatively small number of symbols (e.g., six symbols were removed even though the winning symbol combination included only three symbols). The disclosed gaming system thus increases player excitement and enjoyment because a relatively large number of symbols will be newly generated to display in the empty symbol positions of the symbol matrix, thus increasing the probability of generating additional winning symbol combinations for the play of the game.

Figure 4E:
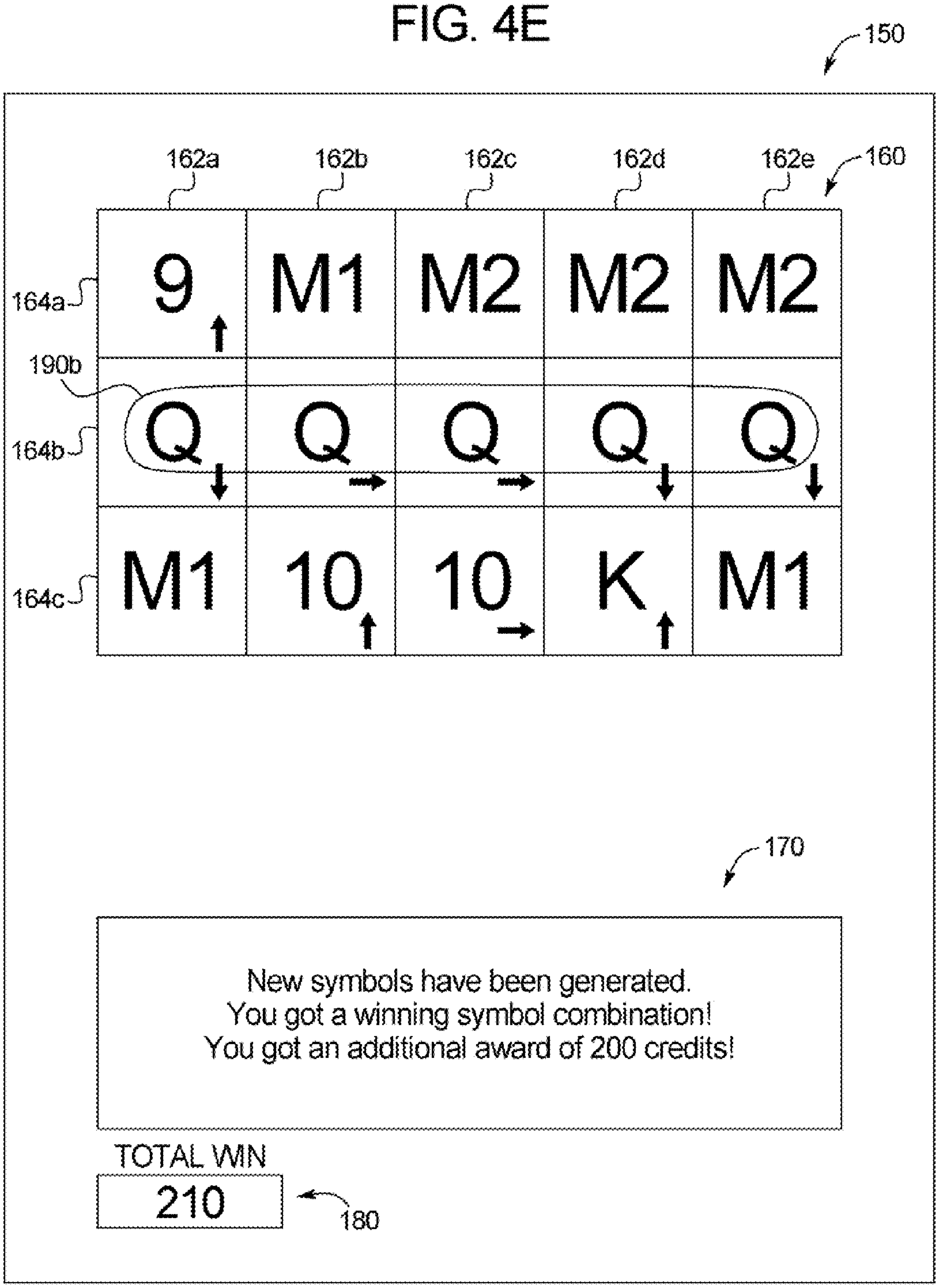

Referring now to FIG. 4E, the gaming system displays a randomly generated symbol in each of the plurality of previously empty symbol positions, resulting in the displayed symbol matrix 160. In the illustrated embodiment, the gaming system randomly generated a symbol for display in each of the plurality of empty symbol positions because no displayed symbol was positioned above an empty symbol position after the shifting described above. If any symbol had been positioned above an empty symbol position, the gaming system would have first shifted such displayed symbol(s) downward into the empty symbol position(s) until no further downward shifting could have been performed, and would thereafter have displayed a randomly generated symbol in each then-remaining empty symbol position. In the illustrated embodiment, the gaming system displays three M1 symbols and three M2 symbols for the play of the game. It should be appreciated that in the original generation of symbols for the illustrated play of the game, illustrated in FIG. 4A, the gaming system only generated two M1 symbols and 1 M2 symbol. Thus, at the point in time illustrated in FIG. 4E, the player has gained both M1 symbols and M2 symbols due to the shifting and removing described herein. It should thus be appreciated that in the illustrated embodiment, player excitement and anticipation builds based on the potential to form a winning symbol combination utilizing one or more of the high-value M1 or M2 symbols.

Referring still to FIG. 4E, at the illustrated point in time, the gaming system determines that another winning symbol combination 190*b* is displayed. Specifically, winning symbol combination 190*b* includes five Q symbols and is displayed along the middle row 164*b* of the symbol matrix 160. In the illustrated embodiment, the game information display area 170 displays a message indicating that such a winning symbol combination 190*b* has been generated, and further indicating that the player has won an award of two-hundred credits for the winning symbol combination 190*b*. Finally, the award display area 180 indicates that for the illustrated play of the game, the player has accumulated a total award of two-hundred-ten credits (i.e., ten credits for winning symbol combination 190*a* and two-hundred credits for winning symbol combination 190*b*).

Figure 4F:
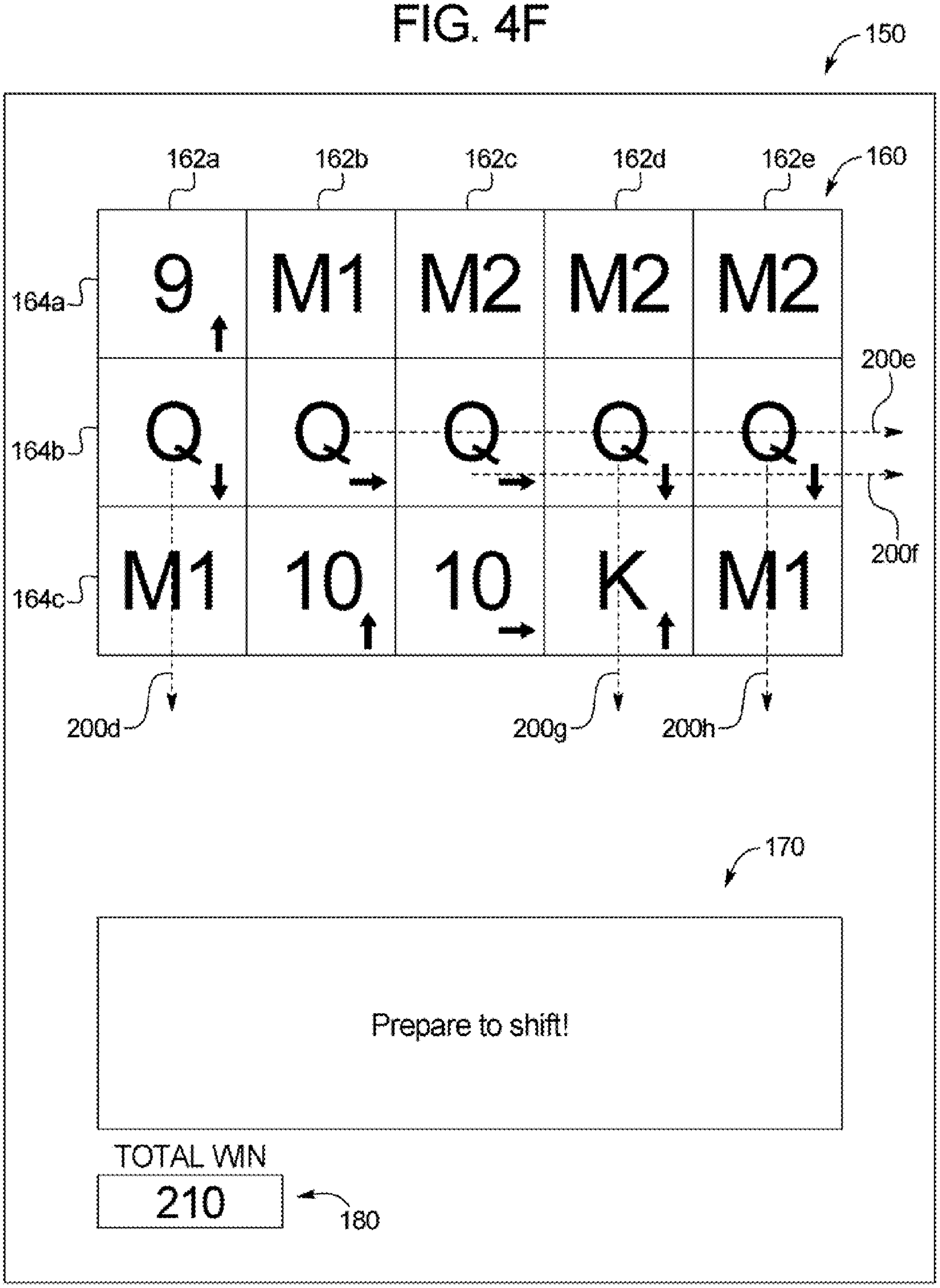

FIG. 4F illustrates the gaming system disclosed herein, including the symbol matrix 160, at a point in time prior to the shifting of any symbols of winning symbol combination 190*b* which are associated with a directional indicator. In the illustrated embodiment, dashed lines 200*d*, 200*e*, 200*f*, 200*g*, and 200*h* indicate the shift paths of the symbols at row 262*b* and column 264*a*, row 262*b* and column 264*b*, row 262*b* and column 264*c*, row 262*b* and column 264*d*, and row 262*b* and column 264*e*, respectively. As above, in one embodiment the gaming system displays the dashed lines 200*d*, 200*e*, 200*f*, 200*g*, and 200*h* prior to performing the shifting indicated thereby. In another embodiment, the gaming system does not actually display the dashed lines to the player.

As further illustrated in FIG. 4F, the gaming system displays a message to the player at game information display area 170 indicating that the shifting will occur for the symbols of winning symbol combination 190*b*. The award display area 180 of FIG. 4F indicates the accumulated award of two-hundred-ten credits for the play of the game.

Figure 4G:
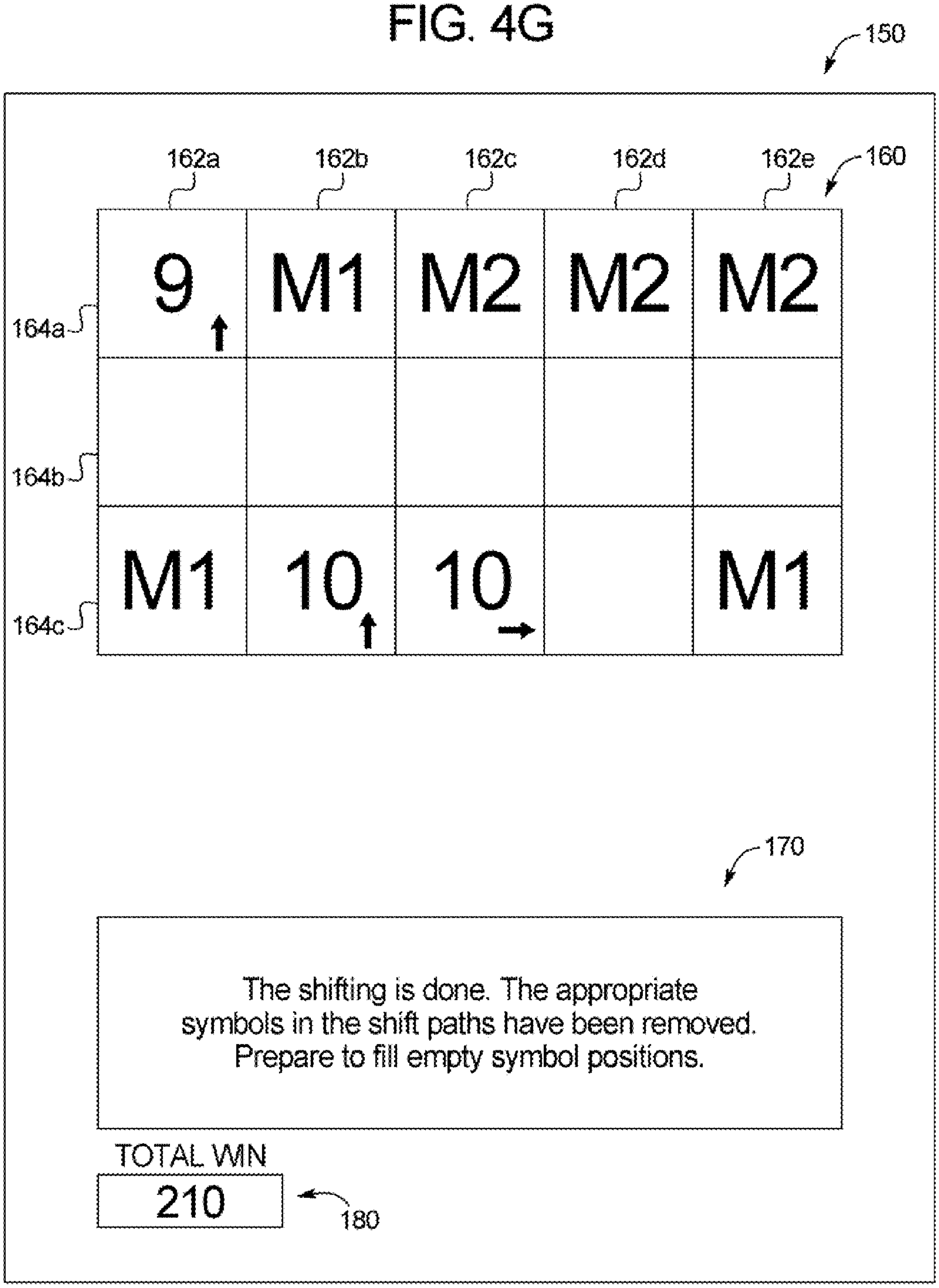

FIG. 4G illustrates the gaming system disclosed herein at a point in time after the symbols of the winning symbol combination 190*b* have been shifted out of or off of the symbol matrix 160 based on a direction indicated by a directional indicator associated with those symbols. As illustrated, each of the symbols of the winning symbol combination 190*b* has been removed from the symbol matrix 160, as has the symbol at row 164*c*, column 162*d*. The game information display area 170 of FIG. 4G displays an indication that the shifting is done, and that the appropriate symbols have been removed. Moreover, the game information display area 170 displays a message indicating that the gaming system will fill the empty symbol positions of the symbol matrix. Finally, award display area 180 continues to display an award of two-hundred-ten credits for the play of the game.

In the illustrated embodiment, although the shift path 200*d* caused the symbol previously displayed at row 164*b*, column 162*a* to encounter the symbol position at row 164*c* and column 162*a* during shifting, the M1 symbol displayed at that symbol position was not removed from the symbol matrix 160. Moreover, at the point in time illustrated by FIG. 4G, the gaming system is displaying a relatively large number of the high-value symbols. Specifically, the symbol matrix at the point in time illustrated in FIG. 4G includes three M1 symbols and three M2 symbols. Thus, the gaming system disclosed herein is configured to increase the probability of large numbers of high-value symbols being displayed in the symbol matrix.

Figure 4H:
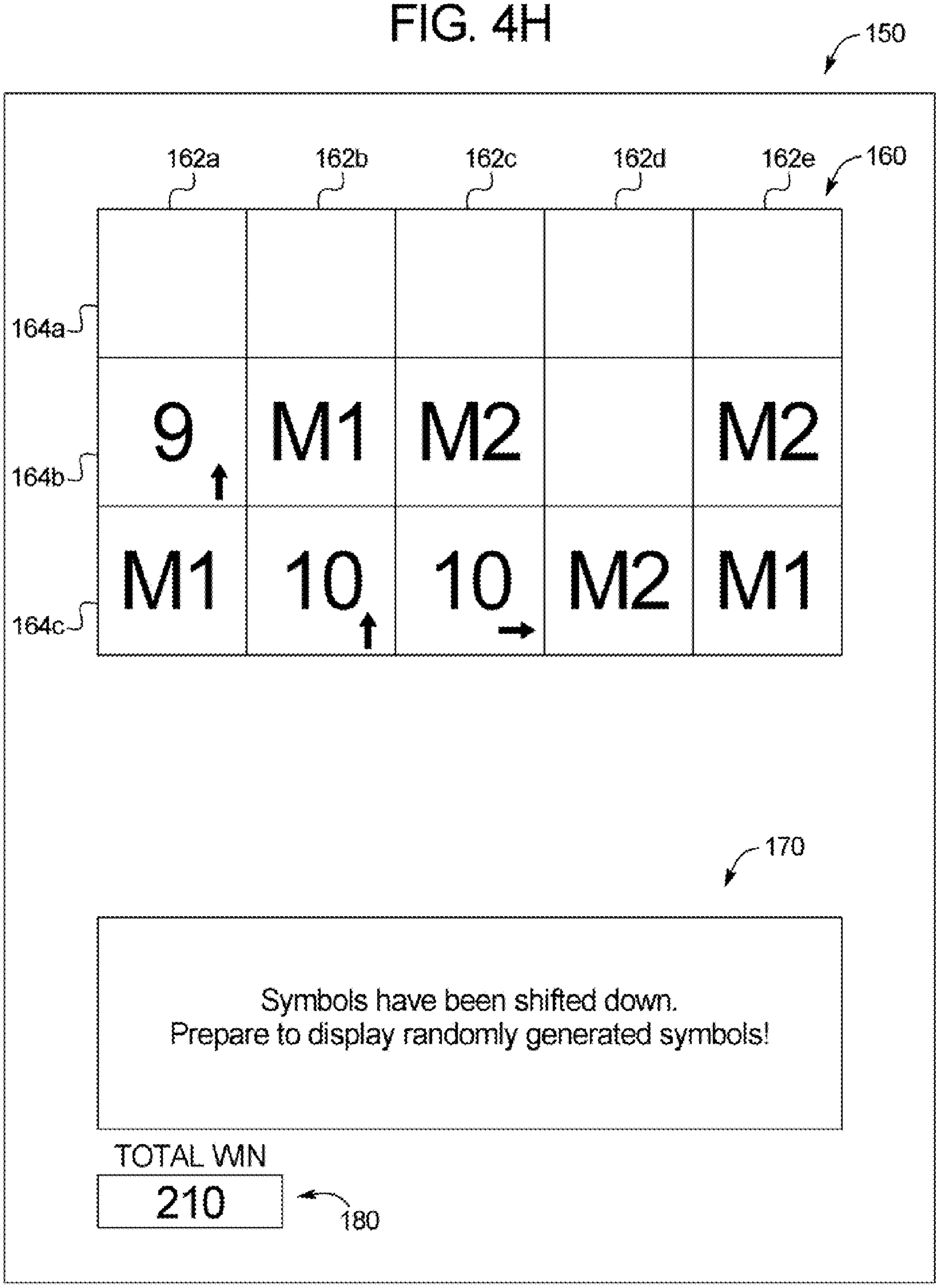

At the point in time illustrated by FIG. 4H, the gaming system has shifted the symbols of the symbol matrix 160 downward as far as possible to fill empty symbol positions created by previous shifting according to directional indicators. Specifically, the gaming system has shifted the symbols of the top row 164*a* of the symbol matrix 160 downward as far as possible, such that any empty symbol positions remaining in the symbol matrix are displayed above the symbols (if any) in each column containing any empty symbol position(s). In the illustrated embodiment, the game information display area 170 displays a message indicating that the symbols of the symbol matrix have been shifted within the matrix, and that additional symbols will be randomly generated to fill the then-remaining empty symbol positions. Moreover, the award display area 180 displays an accumulated award for the play of the game of two-hundred-ten credits.

Figure 4I:
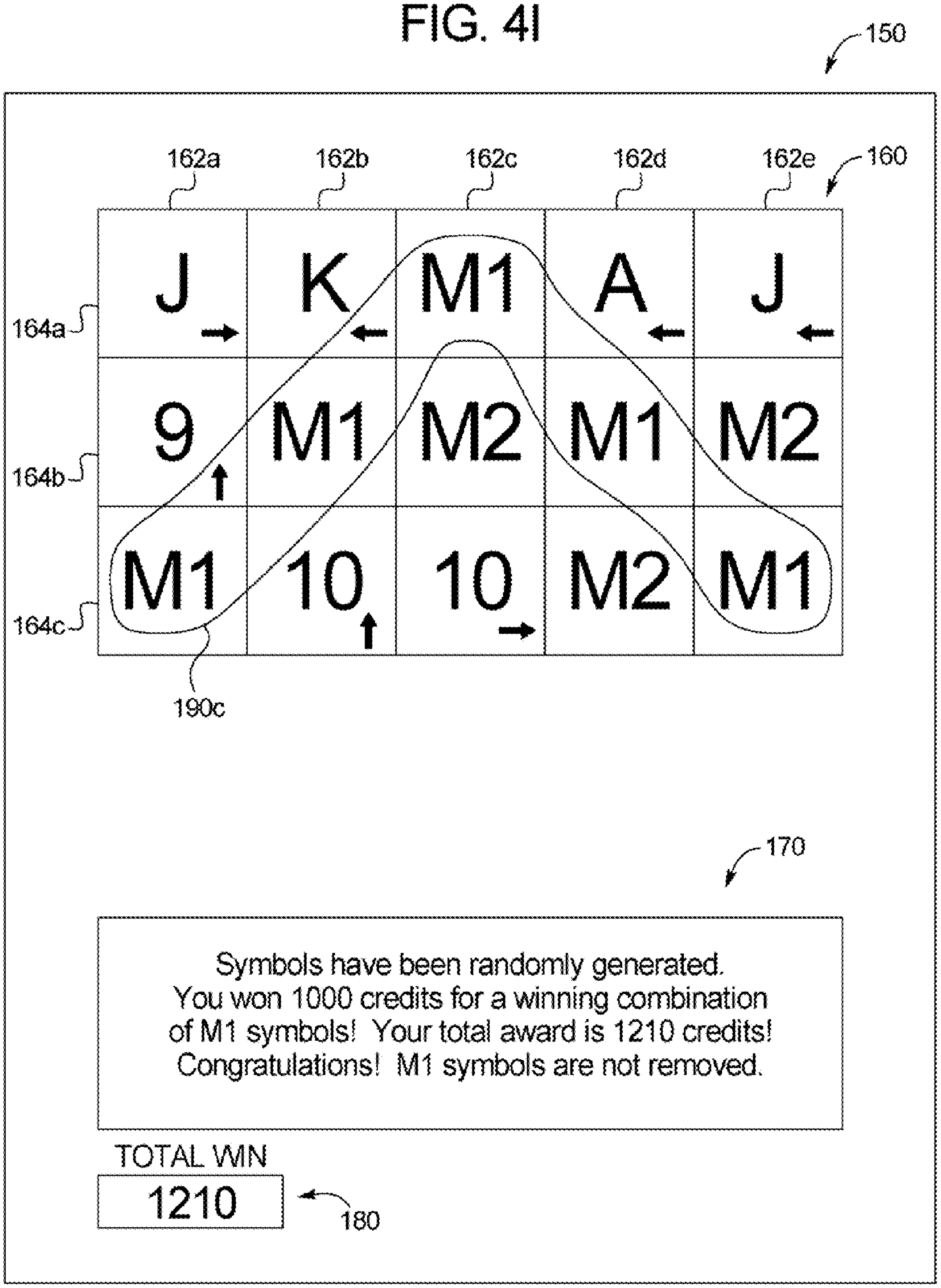

FIG. 4I illustrates the gaming system disclosed herein at a point in time after the gaming system has generated and displayed additional symbols in each of the previously-empty symbol positions of the symbol matrix 160. Specifically, at the point in time illustrated in FIG. 4I, one of the plurality of symbols is displayed in each of the plurality of symbol positions of the symbol matrix 160. Moreover, each symbol which is not an M2 symbol or an M1 symbol is displayed in association with a directional indicator indicating a shift direction for that symbol.

In the illustrated embodiment, the gaming system determines that a new winning symbol combination 190*c* has been generated for the play of the game. Specifically, the gaming system determines that winning symbol combination 190*c*, which includes five M1 symbols, is generated and displayed as an inverted "V" shape beginning at the symbol position at row 164*c* and column 162*a* and ending at the symbol position at row 164*c* and column 162*e*. In the illustrated embodiment, the game information display area 170 indicates that the new winning symbol combination 190*c* is displayed, and indicates that an award of one-thousand credits is associated with that winning symbol combination. Moreover, game information display area indicates that the symbols of the winning symbol combination will not be removed from the display. It should be appreciated that this is because the symbols are major symbols (i.e., M1 symbols). Therefore, the gaming system indicates at award display area 180 that for the play of the game, the player receives an award (i.e., a TOTAL WIN) of one-thousand two-hundred-ten credits. In the illustrated embodiment, the gaming system provides the award to the player, and enables the player to place another wager on a new play of the game.

It should be appreciated that in the illustrated embodiment, since the gaming system did not remove any major symbols (i.e., M1 or M2 symbols) from the display during the play of the game (regardless of whether such major symbols were in any shift path of any shifting symbol), the gaming system provided the player with an increased likelihood that the player would receive an award associated with a winning symbol combination including major symbols. Specifically, by removing non-major symbols and not removing major symbols, and thereafter by shifting the major symbols downward, the gaming system increased the likelihood of generating a winning symbol combination which includes major symbols and is therefore associated with a relatively large award.

In the illustrated embodiment, the gaming system does not remove major symbols which are included in a winning symbol combination. In one embodiment, the gaming system removes one or more major symbols which are included in a winning symbol combination, resulting in one or more empty symbol positions. In another embodiment, wherein the major symbols can be associated with a directional indicator, the gaming system shifts one or more major symbols according to the associated directional indicator. It should be appreciated that if the gaming system removes or shifts one or more major symbols included in a winning symbol combination, the gaming system in one embodiment displays one or more empty symbol positions and thereafter fills such empty symbol position(s) by generating and/or shifting symbols to display in the empty symbol position(s).

It should be further appreciated that in the illustrated embodiment, each non-major symbol (i.e., each symbol which could be removed for a play of the game) was associated with a directional indicator. Thus, the gaming system did not remove any symbols which were (a) included in a winning symbol combination and (b) not associated with a directional indicator. Referring to FIG. 3, then, the gaming system never determined that at least one symbol of at least one winning symbol combination was not associated with a directional indicator, as indicated in diamond 112. Thus, the gaming system did not remove any symbols that were included in a winning symbol combination, but that were not associated with a directional indicator, as indicated by block 114. In one embodiment (not shown) wherein at least one non-major symbol is included in a winning symbol combination but is not associated with a directional indicator, the gaming system disclosed herein simply removes such a symbol and shifts the remaining symbols downward to fill the empty symbol position resulting from the removal.

As discussed above, the gaming system disclosed herein displays one or more directional indicators in association with one or more symbols for a play of the game. In one such embodiment, each symbol of a plurality of symbols is associated with a particular directional indicator, such that each time that symbol is displayed in the symbol matrix or other arrangement of symbols, the symbol is displayed in association with its directional indicator. In another embodiment, a first determination is made as to whether a symbol will be displayed in a symbol position. In this embodiment, a second, separate determination is made as to the directional indicator (if any) to be displayed in association with the displayed symbol. In one such embodiment, the directional indicator is determined based on a weighted table associated with the directional indicators.

In one embodiment, the directional indicator associated with a symbol is determined, in part, based on the location of the symbol in the arrangement of symbols. For example, if a symbol is generated on a left edge of a symbol matrix, the gaming system is more likely to generate a directional indicator indicating a shift direction of right than a directional indicator indicating a shift direction of left. In one such embodiment, the gaming system determines the directional indicator for a plurality of symbols based on a weighted table associated with the symbol position in which that symbol is displayed. In another such embodiment, the gaming system determines the directional indicator for a plurality of symbols based on a weighted table associated with a particular subset of symbols of the symbol matrix, such as based on a weighted table associated with a particular row, column, or other subset of symbols of the symbol matrix.

In one embodiment, the direction indicated by a directional indicator of a symbol is based, at least in part, on one or more symbols displayed adjacent to that symbol. In one such embodiment, if a relatively high-value symbol is displayed adjacent to a symbol, the directional indicator of that symbol is relatively likely to point in the direction of the high-value symbol. In another embodiment, the directional indicator of a symbol is based, at least in part, on at least one symbol which will be generated for a subsequent generation to fill an empty symbol position. For example, if the gaming system determines that a next symbol to be shifted into a symbol position of the first column of the symbol matrix is a high-value symbol, the gaming system will be more likely to generate a directional indicator pointing in the upward or downward direction for each symbol in that column. In this way, the gaming system increases the probability that the high-value symbol will be shifted into the symbol matrix for a play of the game.

In one embodiment, directional indicators can indicate directions of up, down, left, or right. In another embodiment, directional indicators can indicate a diagonal direction. In one embodiment, at least one directional indicator indicates a shift path having two different directions, such as a shift path that begins by shifting a symbol from left-to-right, and thereafter shifts the symbol from top-to-bottom. The directional indicators disclosed herein can indicate any suitable shift path, such as by indicating a direction of shifting of a shape of the shift path, depending on the configuration of the symbol matrix, the position of the symbol in the symbol matrix, or any other suitable criteria.

In one embodiment, each generated symbol is associated with a directional indicator. In another embodiment, a subset of the symbols are not associated with a directional indicator, such as the M1 and M2 symbols described above with respect to FIGS. 4A, 4B, 4C, 4D, 4E, 4F, 4G, 4H, and 4I. In another embodiment, only symbols associated with relatively low-value awards are associated with directional indicators. In another embodiment, the gaming system generates and displays a directional indicator for a symbol only after determining that that symbol is included in a winning symbol combination. In this embodiment, none of the symbols are displayed as initially associated with a directional indicator, but after a winning symbol combination is generated, each of the symbols is displayed as associated with a directional indicator. In another embodiment, after determining that a winning symbol combination is displayed, the gaming system displays at least one but not all of the symbols of the winning symbol combination as associated with a directional indicator. In one embodiment, any symbols which are associated with a directional indicator are displayed but the directional indicators are initially masked, hidden, or otherwise not displayed. In this embodiment, the gaming system displays the directional indicators only when they become relevant—for example, the gaming system displays the directional indicators only when the symbols are found to be in a winning symbol combination.

In various embodiments, the gaming system determines how far to shift a symbol in a shift direction according to a directional indicator associated with that symbol.

In one embodiment, the gaming system disclosed herein shifts at least one symbol according to a directional indicator until that symbol is removed from the symbol matrix. For example, a symbol to be shifted is initially displayed in the top-left corner of the symbol matrix, and is associated with a directional indicator indicating a shift direction from left-to-right along the top row of the symbol matrix. In this embodiment, the gaming system shifts that symbol from left-to-right along the top row of the symbol matrix, altering at least one symbol encountered during shifting, and thereafter removes the shifted symbol from the symbol matrix. That is, the symbol is displayed as shifting off of or out of the symbol matrix, and results in at least one empty symbol position at the original location of the shifted symbol within the symbol matrix. In this embodiment, a shifted symbol for a play of the game is removed from the symbol matrix, and is not usable to form additional winning symbol combinations. In one embodiment, shifting a single symbol for the play of the game results in an alteration to or removal of a plurality of symbols (i.e., the removal of the shifted symbol and an alteration of at least one additional symbol in the symbol path). The described shifting and alteration increases player excitement and enjoyment because the gaming system provides an increased probability of generating additional winning symbol combinations (and therefore additional awards) for a single wager on the play of the game.

In another embodiment, the gaming system disclosed herein shifts one of the plurality of symbols associated with a directional indicator as far as possible in a given direction without shifting the symbol off of or out of the symbol matrix. In this embodiment, it is possible for a generated symbol to be eligible for shifting, but not to move in the symbol matrix—that is, if a symbol is generated in the top row, and is associated with a directional indicator indicating a shift direction of upwards, the gaming system will not display the symbol as moving during any shifting of that symbol. In another embodiment, the gaming system shifts at least one symbol by shifting the symbol off of or out of the symbol matrix and back into or on the symbol matrix on the opposite side. For example, if a symbol to be shifted is at the top of one of the columns, and is associated with a shift direction of up, the gaming system shifts the symbol from the top position in the column to the bottom position of that column. In a further embodiment, the gaming system shifts such a symbol at least one symbol beyond the opposite symbol position.

In one embodiment, the symbols displayed in the symbol matrix are not associated with individual directional indicators. In this embodiment, the gaming system displays a global or universal directional indicator associated with a plurality of different symbols. In this embodiment, for each of the plurality of displayed symbols which are shifted during a play of the game and which are associated with the universal directional indicator, the gaming system shifts that symbol based on the displayed universal directional indicator. In another embodiment, the gaming system displays a first universal directional indicator associated with each of a first kind of symbols. In this embodiment, the gaming system displays a different directional indicator for a different, second kind of symbol. For example, for each instance of a first symbol displayed in the symbol matrix, the gaming system shifts that symbol in a shift direction based on a first universal directional indicator. For each instance of a second symbol displayed in the symbol matrix, the gaming system shifts that symbol in a shift direction based on a second universal directional indicator. In one embodiment at least one of the universal directional indicators is randomly determined for each play of the game. In another embodiment, the universal directional indicator is randomly determined a plurality of times for each play of the game, such as being randomly determined for each generation of additional symbols during a play of the game. In one embodiment, the gaming system utilizes a single universal directional indicator for each of any displayed winning symbol combinations. For example, if a winning symbol combination includes three symbols, the gaming system randomly determines a universal directional indicator and shifts each of the three symbols in a direction determined based on that universal directional indicator.

In one embodiment, if a symbol to be shifted is displayed in a designated position of the symbol matrix, the shifting functionality applicable to other symbols is altered based on the designated position. In one such embodiment, if a symbol is displayed in a designated position, the gaming system displays the symbol as exploding or otherwise removing one or more symbols adjacent to that symbol. For example, a symbol displayed in a corner of the symbol matrix may explode and remove one or more adjacent symbols. In another embodiment, the gaming system. In another embodiment, a symbol positioned at the edge of the symbol matrix is shifted by wrapping around to the other side of the matrix, as discussed above. For example, if a symbol to be shifted is displayed along an edge of the symbol matrix, the gaming system shifts that symbol the corresponding position on the opposite side of the symbol matrix.

In one embodiment, the gaming system is configured to display at least one designated symbol which is not altered by a shifting symbol for a play of the game. In a further embodiment, the designated symbol cannot be generated in association with a directional indicator, and as such cannot be shifted out of or off the symbol matrix. For example, the gaming system is configured to display a randomly generated designated high-value symbol which is not removed during a play of the game, even if that designated high-value symbol is in a shift path of a shifting symbol. Further, the designated high-value symbol cannot be generated in association with a directional indicator, so the designated high-value symbol cannot be shifted off of our out of the symbol matrix. In this embodiment, regardless of which symbol(s) are shifted for the play of the game, the gaming system does not alter the designated high-value symbol from the symbol matrix. Thus, in addition to removing or altering a plurality of symbols based on a single shifted symbol, the gaming system also increases player excitement and enjoyment because the plurality of removed symbols do not include the designated high-value symbol. Thus, the gaming system increases the probability of generating additional winning symbol combinations, and winning symbol combinations associated with higher-value awards, for the play of the game.

In a further embodiment, the gaming system disclosed herein is configured to shift at least one symbol along a shift path which causes at least one symbol not included in a winning symbol combination to be altered during the play of the game. In one example embodiment, if a winning symbol combination is generated along a diagonal line from the top left corner of the symbol matrix and extending toward the bottom-center symbol position, the gaming system determines that the symbol in the top left corner should be shifted. In one such embodiment, the symbol to be shifted is associated with a directional indicator indicating a shift path from left-to-right along the top row of the symbol matrix. In this embodiment, the shift path includes a plurality of symbols which were not included in the winning symbol combination—that is, the shift path includes each of the symbols of the top row of the symbol matrix. For the play of the game, the gaming system alters alter (such as by removing) at least one symbol of the shift path that was not included in the winning symbol combination. The gaming system disclosed herein also increases player excitement and enjoyment by causing at least one symbol which was not included in a winning symbol combination to be altered or removed from the symbol matrix based on a shift direction indicated by a directional indicator of at least one symbol of the winning symbol combination.

In alternative embodiments, the gaming system disclosed herein is configured to shift one or more symbols along different shift paths than those disclosed above. For example, the gaming system may shift symbols along a shift path around the perimeter of an arrangement of symbols. The gaming system may also shift symbols in a zig-zag or stepped pattern, whereby a symbol is alternately moved horizontally and then vertically, such as by being moved to the right, then down, then to the right, then down, until the symbol reaches a termination of the shift path. The shift path may be determined randomly, such as by determining a random direction for each shift along the shift path. It should be appreciated that the instant disclosure is not limited by the shape, direction, or length of the shift paths disclosed herein. Rather, any appropriate shift path is contemplated and is within the scope of the instant disclosure.

In one embodiment, the gaming system provides an additional award to a player for a play of the game based on at least one symbol being removed from the symbol matrix. In one such embodiment, for each symbol shifted off of our out of the symbol matrix (i.e., each symbol of a winning symbol combination which is associated with a directional indicator), the gaming system provides an additional award to the player. In another embodiment, for each symbol removed because it is encountered by a shifting symbol during the play of the game, the gaming system provides an additional award to the player. In one such embodiment, the additional award is based on which symbol was removed because it was encountered (i.e., it was in the shift path by the shifting symbol). In another such embodiment, the additional award is based on which symbol was shifting, wherein the shifting caused a symbol to be removed. In another embodiment, the additional award is based, at least in part, on a quantity of symbols removed by the shifting of a single symbol. In another embodiment, the additional award is based, in part, on a quantity of symbols shifted for the play of the game.

As discussed above, in various embodiments a shifting symbol encounters one or more symbols during shifting and alters at least one symbol based on the encountering. In one such embodiment, the gaming system alters at least one symbol by removing the encountered symbol from the symbol matrix. In another embodiment, the gaming system alters at least one symbol by displaying the shifting symbol as being reflected by or bouncing off of the encountered symbol. In this embodiment, the gaming system displays the symbol as shifting in the opposite direction following the encounter. In one embodiment, the gaming system alters at least one symbol by causing the shifting symbol to change shift directions, such as by changing from a shift direction of left-to-right to a shift direction of bottom-to-top of the symbol matrix. In one embodiment, if the alteration causes a shifting symbol to be caught between two symbols, the gaming system removes the shifting symbol from the symbol matrix. In one embodiment, when a shifting symbol encounters another symbol, the gaming system alters at least one symbol by causing the encountered symbol to shift. In one such embodiment, the encountered symbol shifts by one symbol position in the direction of shifting of the shifting symbol. In another embodiment, the encountered symbol shifts in a random direction.

In one embodiment, the gaming system alters a symbol when a shifting symbol encounters another symbol in the same way, regardless of which symbol is shifting and regardless of which symbol is encountered. In another embodiment, the gaming system alters a symbol differently depending on which symbol is encountered. For example, if a relatively high-value symbol is encountered, the gaming system alters at least one symbol by causing the shifting symbol to pass by the encountered symbol without modifying the shifting symbol. In this example, if a relatively low-value symbol is encountered, the gaming system alters at least one symbol by removing the encountered symbol. In another example, if a relatively high-value symbol is encountered, the gaming system causes the shift direction of the shifting symbol to change, such as by causing the shifting symbol to shift in the opposite direction. In this example, if a relatively low-value symbol is encountered, the gaming system removes the encountered symbol from the symbol matrix.

In various embodiments, the gaming system disclosed herein is configured to shift at least one symbol for the play of the game which is not included in a winning symbol combination. In one such embodiment, if a designated symbol is generated during a play of the game, the gaming system shifts that symbol regardless of whether it was included in a winning symbol combination.

In one embodiment, as discussed above, after removing any symbols based on shifting, the gaming system fills any empty symbol positions by shifting all displayed symbols downward as far as possible, and by thereafter displaying randomly generated symbols in the remaining empty symbol positions. In another embodiment, the gaming system fills any empty symbol positions by displaying a randomly-generated symbol in the empty symbol positions without first shifting previously-displayed symbols downward. In another embodiment, the gaming system shifts the displayed symbols in a direction other than downward prior to filling any empty symbol positions. In various such embodiments, the gaming system shifts the displayed symbols to the left, to the right, upward, toward the perimeter of the symbol matrix, toward the center of a symbol matrix, or according to a direction indicated by a universal directional indicator.

The gaming system disclosed herein increases player enjoyment, in part, by enabling a single symbol of a winning symbol combination to remove or otherwise alter a plurality of different symbols in the symbol matrix. Thus, a play of the game disclosed herein can result in additional empty symbol positions, which results in additional shifting of symbols within the symbol matrix and ultimately additional newly generated symbols displayed in the symbol matrix. Moreover, the gaming system disclosed herein increases player excitement and enjoyment by causing the symbols of a winning symbol combination to shift and remove at least one additional symbol not included in the winning symbol combination. Since in one embodiment each empty symbol position of the symbol matrix represents an opportunity to generate an additional, high-value symbol for the play of the game, the gaming system increases player excitement and enjoyment by providing an increased likelihood of generating additional winning symbol combinations, and generating winning symbol combinations associated with higher awards, for a single play of the game.

In one embodiment, wherein at least one high-value symbol is not removed or altered during a play of the game (i.e., regardless of whether it is encountered by a shifting symbol), the gaming system disclosed herein increases player excitement and enjoyment by increasing the probability that a high concentration of high-value symbols will result in a winning symbol combination associated with a relatively large award. In a further embodiment, the more symbols that are shifted during the play of the game (and the more generations of symbols that occur), the higher the concentration of high-value symbols within the symbol matrix. In addition, because in one embodiment the gaming system fills empty symbol positions by shifting all symbols of the symbol matrix downward as far as possible, the high-value symbols will tend to be concentrated in the lower rows of the symbol matrix, further increasing the probability of obtaining a winning symbol combination associated with a relatively high-value award.

The gaming system disclosed herein further increases player excitement and enjoyment by enabling clusters of mismatching symbols to be removed or otherwise altered, enabling those clusters to display winning symbol combinations. For example, if a cluster of symbols which could not display a winning symbol combination (i.e., because the cluster contains alternating symbols which do not match) is displayed, the gaming system disclosed herein enables a shifting symbol of a winning symbol combination which does not include any symbols of the cluster to cause one or more symbols of the cluster to be removed. Thus, the gaming system enables the cluster to be removed entirely, or to be broken up and the symbols contained therein to be shifted, to enable additional winning symbol combinations not previously possible.

It should be appreciated that various determinations discussed throughout the instant disclosure can be made based on various conditions as appropriate to provide a game having a particular desired player experience. Specifically, in various embodiments, to implement a game providing players with different player experiences, the determinations of:

a. whether a symbol is shifted for a play of the game;
b. which symbols are shifted for the play of the game;
c. which directional indicator is associated with a symbol;
d. how the gaming system shifts symbols based on any associated directional indicators;
e. any universal directional indicator;
f. the symbols with which any universal directional indicator is associated;
g. any altered shifting functionality;
h. which symbol(s) are altered;
i. how any symbol(s) are altered;
j. any additional award provided based on which symbol(s) are shifted and/or altered;
k. which direction any previously-displayed symbols are shifted (i.e., after shifting according to associated directional indicator(s));
l. the mechanism for filling empty symbol positions after shifting according to associated directional indicator(s); and/or
m. any other determination made by the gaming system disclosed herein can be predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing, said plurality of input devices including:
(i) an acceptor, and
(ii) a cashout device;

at least one display device supported by the housing;

at least one processor; and at least one memory device which stores a plurality of instructions, which when executed by the at least one processor, cause the at least one processor to operate with the plurality of input devices and the at least one display device to:

(a) if a physical item is received via the acceptor, establish a credit balance based, at least in part, on a monetary value associated with the received physical item,
(b) for a play of a game:
(i) display a plurality of symbol positions in a designated arrangement of symbol positions,
(ii) for each of the symbol positions, display a randomly generated one of a plurality of symbols in said symbol position,
(iii) determine if the displayed symbols form any winning symbol combinations, and
(iv) if the displayed symbols form any winning symbol combinations:
(A) provide an award based on each winning symbol combination;
(B) determine if any of the symbols of each winning symbol combination is individually associated with one of a plurality of different shift paths, wherein at least one of said shift paths includes at least one designated non-winning symbol determined not to be in any winning symbol combination;
(C) for each symbol of each winning symbol combination individually associated with one of the plurality of shift paths:
(I) display said symbol as shifting along said associated shift path, and
(II) remove the shifted symbols and any designated non-winning symbols,
(D) display one of the plurality of symbols in each of any empty symbol positions, and
(E) repeat (b)(iii) and (d)(iv), and
(c) if a cashout input is received via the cashout device, cause an initiation of any payout associated with the credit balance.

2. The gaming system of claim 1, wherein the plurality of instructions cause the at least one processor to operate with the at least one display device to remove any shifted symbols and any designated non-winning symbol by removing each of said symbols along any of the shift paths associated with any of the displayed symbols.

3. The gaming system of claim 1, wherein the plurality of instructions cause the at least one processor to operate with the at least one display device to remove at least one symbol of any winning symbol combination which is not associated with any directional indicator.

4. The gaming system of claim 1, wherein the award is based, at least in part, on any removed symbols for the play of the game.

5. The gaming system of claim 1, wherein at least one of the plurality of symbols is associated with a directional indicator and the shift path of said shifted symbol is based on any directional indicator associated with said shifted symbol.

6. The gaming system of claim 1, wherein the plurality of instructions cause the at least one processor to operate with the at least one display device to display at least one randomly generated directional indicator in association with at least one of the displayed symbols, wherein the shift path of the at least one shifted symbol of the at least one winning symbol combination is based on the displayed directional indicator associated with that at least one shifted symbol.

7. The gaming system of claim 6, wherein the plurality of instructions cause the at least one processor to operate with the at least one display device to display the at least one randomly generated directional indicator in association with at least one of the symbols of the plurality of symbol positions based, at least in part, on a location of that at least one symbol.

8. The gaming system of claim 1, wherein the plurality of instructions cause the at least one processor to operate with the at least one display device to display at least one universal directional indicator and display at least two symbols as shifting along at least two shift paths for the play of the game, the shift paths of the at least two shifted symbols each based on the at least one universal directional indicator.

9. The gaming system of claim 8, wherein the plurality of instructions cause the at least one processor to operate with the at least one display device to randomly determine a direction of the at least one universal directional indicator at least twice for the play of the game.

10. The gaming system of claim 1, wherein at least one of the plurality of symbols is a designated symbol, and if the designated symbol is in the shift path, when executed by the at least one processor, the plurality of instructions cause the at least one processor to operate with the at least one display device to display the designated symbol as remaining at one of the symbol positions regardless of any displayed shifting.

11. The gaming system of claim 1, wherein the plurality of instructions cause the at least one processor to operate with the at lease one display device to, for at least one of any empty symbol positions, display one of the plurality of symbols in said empty symbol position by displaying at least one already-generated symbols as shifting into said empty symbol position and thereafter randomly generating one of the plurality of symbols in at least one then-empty symbol positions.

12. A gaming system comprising:
- a housing;
- a plurality of input devices supported by the housing, said plurality of input devices including:
  - (i) an accceptor, and
  - (ii) a cashout device;
- at least one display device supported by the housing;
- at least one processor; and
- at least one memory device which stores a plurality of instructions, which when executed by the at least one processor, cause the at least one processor to operate with the plurality of input devices and the at least one display device to:
  - (a) if a physical item is received via the acceptor, establish a credit balance based, at least in part, on a monetary value associated with the received physical item,
  - (b) for a play of a game:
    - (i) for each of the plurality of symbol positions, display a randomly generated one of a plurality of symbols in said symbol position,
    - (ii) determine if the displayed symbols form any winning symbol combinations,
    - (iii) for each of any winning symbol combinations:
      - (A) display an award based on said winning symbol combination, and
      - (B) for each of any of the symbols of said winning symbol combination individually associated with a displayed directional indicator:
        - (I) display said symbol as shifting along a shift path indicated by the displayed directional indicator individually associated with said symbol, and
        - (II) remove any symbols displayed in any symbol positions along the shift path, and
    - (iv) for each of any empty symbol positions:
      - (A) display one of the plurality of symbols in that empty symbol position,
      - (B) determine if the displayed symbols form any winning symbol combinations, and
      - (C) modify the award based on any displayed winning symbol combinations, and
  - (c) if a cashout input is received via the cashout device, cause an initiation of any payout associated with the credit balance.

13. The gaming system of claim 12, wherein the award is based, at least in part, on any removed symbols for the play of the game.

14. The gaming system of claim 12, wherein each of the plurality of symbols is associated with one of a plurality of directional indicators and the shift path for each symbol is based on the directional indicator for that symbol.

15. The gaming system of claim 12, wherein each of a first type of symbol is associated with one of a plurality of directional indicators and each of a second type of symbol is not associated with any directional indicators.

16. The gaming system of claim 15, wherein each of the first type of symbol is associated with a same universal directional indicator.

17. The gaming system of claim 16, wherein the universal directional indicator is a first universal directional indicator and each of a third type of symbol is associated with a different second universal directional indicator.

18. The gaming system of claim 12, wherein the plurality of instructions cause the at least one processor to operate with the at least one display device to randomly generate and display at least one directional indicator in association with at least one of the displayed symbols.

19. The gaming system of claim 18, wherein the plurality of instructions cause the at least one processor to operate with the at least one display device to randomly generate and display the at least one directional indicator in association with at least one of the generated symbols based on a displayed location of that at least one symbol.

20. The gaming system of claim 12, wherein the plurality of instructions cause the at least one processor to operate with the at lease one display device to, for at least one of any empty symbol positions, display one of the plurality of symbols in said empty symbol position by displaying at least one already-generated symbols as shifting into said empty symbol position and thereafter randomly generating one of the plurality of symbols in at least one then-empty symbol positions.

21. The gaming system of claim 12, wherein the plurality of instructions cause the at least one processor to operate with the at least one display device to, after (b)(iii), repeat (b)(ii) and (b)(iv) at least once.

22. A gaming system comprising:
- a housing;
- a plurality of input devices supported by the housing, said plurality of input devices including:
  - (i) an acceptor, and
  - (ii) a cashout device;
- at least one display device supported by the housing;
- at least one processor; and
- at least one memory device which stores a plurality of instructions, which when executed by the at least one processor, cause the at least one processor to operate with the plurality of input devices and the at least one display device to:
  - (a) if a physical item is received via the acceptor, establish a credit balance based, at least in part, on a monetary value associated with the received physical item, (b) for a play of a game:

(i) for each of a plurality of symbol positions, display a randomly generated one of a plurality of symbols in said symbol position, the plurality of symbols including a predetermined shiftable symbol and a predetermined path-altering symbol, and (ii) if any winning symbol combinations are displayed:

(A) provide an award based, at least in part, on each winning symbol combination, (B) for each of any of the symbols of at least one of the winning symbol combinations which is the shiftable symbol:

(I) display said shiftable symbol as shifting along a first shift path, and (II) for each symbol position in the shift path:

(1) if the symbol displayed in that symbol position is not the path-altering symbol, remove said symbol from display, and (2) if the symbol displayed in that symbol position is the path-altering symbol, display said shiftable symbol as shifting along a second, different shift path, and (C) if any empty symbol positions are displayed:

(I) display one of the plurality of symbols in each of any empty symbol positions, and (II) repeat (b)(ii)A and (b)(ii)(B) at least once.

23. The gaming system of claim 22, wherein the plurality of instructions cause the at least one processor to operate with the at least one display device to generate at least one directional indicator in association with the shiftable symbol.

24. The gaming system of claim 23, wherein the plurality of instructions cause the at least one processor to operate with the at least one display device to display the shiftable symbol in association with a directional indicator each time the shiftable symbol is generated for the play of the game.

25. The gaming system of claim 23, wherein the plurality of instructions cause the at least one processor to operate with the at least one input device and the at least one display device to randomly determine the directional indicator of the shiftable symbol after generating the shiftable symbol in one of the plurality of symbol positions.

26. The gaming system of claim 23, wherein at least one of the directional indicators is generated based, at least in part, on a position of at least one shiftable symbol with which the at least one directional indicator is associated within the plurality of symbol positions.

27. The gaming system of claim 22, wherein the award is based, at least in part, on a quantity of path-altering symbols in the shift path of any shifted symbol for the play of the game.

28. The gaming system of claim 22, wherein the award is based, at least in part, on a quantity of symbols removed from the plurality of symbol positions during the play of the game.

29. The gaming system of claim 22, wherein the plurality of instructions cause the at least one processor to operate with the at least one input device and the at least one display device to, if any empty symbol positions are displayed, repeat (b)(ii) A, (b)(ii)B, and (b)(iii)(C).

30. A gaming system comprising:

a housing;

a plurality of input devices supported by the housing, said plurality of input devices including:

(i) an acceptor, and (ii) a cashout device;

at least one display device supported by the housing;

at least one processor; and at least one memory device which stores a plurality of instructions, which when executed by the at least one processor, cause the at least one processor to operate with the plurality of input devices and the at least one display device to:

(a) if a physical item is received via the acceptor, establish a credit balance based, at least in part, on a monetary value associated with the received physical item, (b) for a play of a game:

(i) display a plurality of symbol positions in a designated arrangement of symbol positions, (ii) for each of the symbol positions, display a randomly generated symbol in said symbol position, (iii) determine if the displayed symbols form any winning symbol combinations, and (iv) if the displayed symbols form any winning symbol combinations:

(A) provide an award based on each winning symbol combination;

(B) for each of any of the symbols of each of any winning symbol combinations which is individually associated with a directional indicator:

(I) display said symbol as shifting according to said directional indicator, and (II) remove said shifted symbol and at least one non-shifted symbol which is not included in any winning symbol combination, (C) remove at least one symbol of at least one winning symbol combination which is not associated with any directional indicator;

(D) display one of the plurality of symbols in each of any empty symbol positions, and (E) repeat (iii) and (iv), and (c) if a cashout input is received via the cashout device, cause an initiation of any payout associated with the credit balance.

31. The gaming system of claim 30, wherein the plurality of instructions cause the at least one processor to operate with the at least one display device to display at least one randomly generated directional indicator in association with at least one of the displayed symbols.

32. The gaming system of claim 31, wherein the plurality of instructions cause the at least one processor to operate with the at least one display device to display the at least one randomly generate directional indicator in association with at least one of the symbols of the plurality of symbol positions based, at least in part, on a location of that at least one symbol.

33. The gaming system of claim 30, wherein the plurality of instructions cause the at least one processor to operate with the at least one display device to associate at least two different symbols with a same universal directional indicator.

34. The gaming system of claim 33, wherein the plurality of instructions cause the at least one processor to operate with the at least one display device to randomly determine a direction of the at least one universal directional indicator at least twice for the play of the game.

35. The gaming system of claim 30, wherein the plurality of instructions cause the at least one processor to operate with the at lease one display device to, for at least one of any empty symbol positions, display one of the plurality of symbols in said empty symbol position by displaying at least one already-generated symbols as shifting into said empty symbol position and thereafter randomly generating one of the plurality of symbols in at least one then-empty symbol positions.

* * * * *